(12) United States Patent
Sekiguchi

(10) Patent No.: US 6,567,060 B1
(45) Date of Patent: May 20, 2003

(54) LIQUID DISPLAY

(75) Inventor: Kanetaka Sekiguchi, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/529,477

(22) PCT Filed: Oct. 16, 1998

(86) PCT No.: PCT/JP98/04699

§ 371 (c)(1),
(2), (4) Date: Apr. 13, 2000

(87) PCT Pub. No.: WO99/21051

PCT Pub. Date: Apr. 29, 1999

(30) Foreign Application Priority Data

Oct. 16, 1997 (JP) .............................................. 9-283225

(51) Int. Cl.[7] ................................................ G09G 3/36
(52) U.S. Cl. ............................. 345/87; 345/89; 345/108
(58) Field of Search ........................... 345/89, 87, 102; 349/114, 113, 106, 96, 110, 61; 359/485

(56) References Cited

U.S. PATENT DOCUMENTS

| | | | | |
|---|---|---|---|---|
| 5,686,979 A | * | 11/1997 | Weber et al. | 349/96 |
| 5,691,788 A | * | 11/1997 | Kim | 349/110 |
| 5,920,367 A | * | 7/1999 | Kajimoto et al. | 349/114 |
| 6,008,871 A | * | 12/1999 | Okumura | 349/113 |
| 6,101,032 A | * | 8/2000 | Wortman et al. | 359/485 |
| 6,130,735 A | * | 10/2000 | Hatanaka et al. | 349/113 |
| 6,317,181 B1 | * | 11/2001 | Hoshino | 349/106 |

FOREIGN PATENT DOCUMENTS

| | | |
|---|---|---|
| JP | 52-150981 | 5/1951 |
| JP | 55-52005 | 4/1980 |
| JP | 57-154291 | 9/1982 |
| JP | 62-47625 | 3/1987 |

\* cited by examiner

*Primary Examiner*—Dennis-Doon Chow
(74) *Attorney, Agent, or Firm*—Armstrong, Westerman & Hattori, LLP

(57) ABSTRACT

A printed layer having opening portions is provided at a position opposite to an observer of a liquid crystal display device, a display is performed by use of absorption or chromaticity of the printed layer when an external light source is utilized, and a display is performed by transmitting light through the opening portions of the printed layer when an auxiliary light source is turned on, and further different voltages between when the external light source is utilized and when the auxiliary light source is used are applied to a liquid crystal layer by a gradation reversal circuit. Moreover, reversal of brightness and darkness of a display by the use of the external light source and the auxiliary light source is eliminated by a polarizing film or a cholesteric liquid crystal polymer film disposed on the rear face of the liquid crystal display device, thereby enabling a liquid crystal display device with excellent visibility.

25 Claims, 10 Drawing Sheets

FIG. 4
X : THIS EMBODIMENT
Y : CONVENTIONAL EXAMPLE
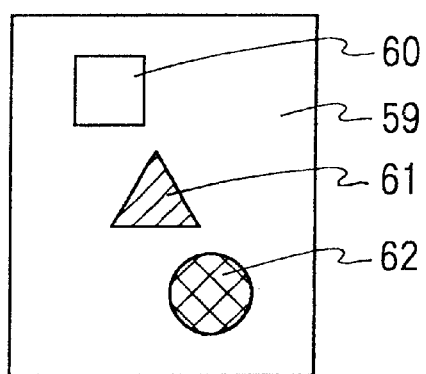
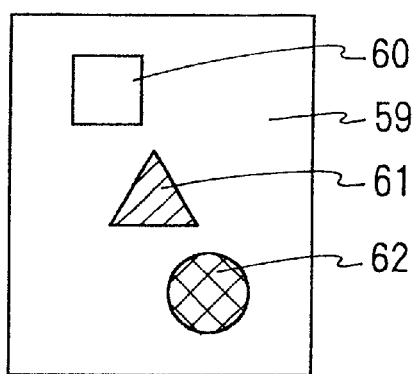
TURN ON AUXILIARY LIGHT SOURCE BECAUSE EXTERNAL ENVIRONMENT IS DARK — 39
PROVIDE OPENING PORTIONS IN PRINTED LAYER 14
OPERATE GRADATION REVERSAL CIRCUIT — 37
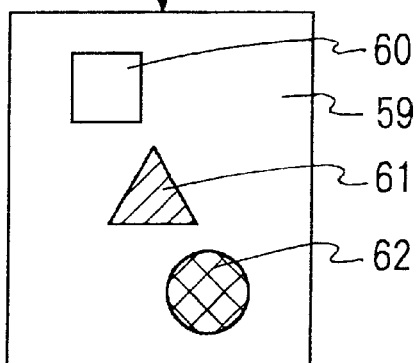
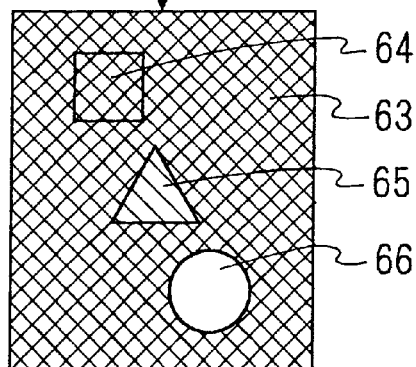
BRIGHTNESS AND DARKNESS NORMAL DISPLAY
BRIGHTNESS AND DARKNESS REVERSE DISPLAY

LIQUID DISPLAY

TECHNICAL FIELD

The present invention relates to a liquid crystal display device, more specifically, to a liquid crystal display device for performing a bright display using a reflection-type polarizing film by its reflection characteristic, or performing a display using a selective-reflection type film by its difference in color tones.

BACKGROUND TECHNOLOGY

Recently, a reflection-type liquid crystal display device for performing a display by an external light source has been developed as a liquid crystal display device for portable information processing devices, and improvement of brightness and multi-color display has progressed. As a method for improving brightness, a method is tried in which a reflection-type polarizing film is provided on the side of a liquid crystal cell opposite to the visible side, and a printed layer is formed on the rear face of the reflection-type polarizing film. The reflection-type polarizing film has a transmission axis and a reflection axis as two optical axes orthogonal to each other and has characteristics for transmitting a light linearly polarized in the direction parallel to the transmission axis but for reflecting an incident light linearly polarized in the direction parallel to the reflection axis.

Moreover, as another method for improving brightness of the liquid crystal display device, a method using a selective-reflection characteristic of a cholesteric liquid crystal polymer is also considered.

The polarizing film conventionally and widely used in a liquid crystal display panel is an absorption-type polarizing film. The absorption-type polarizing film has two optical axes, a transmission axis and an absorption axis, orthogonal to each other, and it has characteristics for transmitting a light linearly polarized in the direction parallel to the transmission axis but for absorbing an incident light linearly polarized in the direction parallel to the absorption axis.

Therefore, the absorption-type polarizing film is used in combination with the aforesaid reflection-type polarizing film, whereby the liquid crystal display device has a large transmission characteristic when the transmission axes of the polarizing films are parallel to each other and a large reflection characteristic when the transmission axes are orthogonal to each other.

Accordingly, the liquid crystal display device has a large absorption characteristic (a black display) when the two absorption-type polarizing films are disposed in such a manner that the transmission axes thereof are orthogonal to each other, different from a transmission characteristic when they are disposed in such a manner that the transmission axes are parallel to each other.

In the case of the liquid crystal display device using two absorption-type polarizing films, a reflector is disposed on the rear face side of the absorption-type polarizing film disposed on the side opposite to the visible side in relation to the liquid crystal cell, whereby a bright display is performed by reflecting incident light from the external light source to the visible side in a transmission state and a dark display is performed in an absorption state. In this case, however, since the reflected light which is viewed passes through the absorption-type polarizing film positioned on the reflector twice, the light is absorbed partly, resulting in a display of which brightness somewhat decreases.

Moreover, the reflector having light scattering properties is used, absorption by the absorption-type polarizing film occurs due to instability in polarization by the reflector, whereby brightness be come impaired.

Furthermore, in a dark environment without an external light source, since the visibility of the display of the liquid crystal display device extremely deteriorates, an auxiliary light source is provided in the liquid crystal display device in many cases. In that case, a reflector of a transflective-type is used in place of the reflector without a transmission characteristic.

In this case, the bright display by reflection of an incident light from the external light source, briefly explained except for the liquid crystal layer, corresponds to the case where the transmission axes of the two absorption-type polarizing films are parallel to each other, resulting in a bright display also in the case where the auxiliary light source is used. The converse dark display corresponds to the case where the transmission axes of the two absorption-type polarizing films are orthogonal to each other, resulting in a bright display also in the case where the auxiliary light source is used.

In contrast to the above, according to the liquid crystal display device using an absorption-type polarizing film and a reflection-type polarizing film in combination, in the case where the external light source is used, a bright state is a state where the transmission axis of the absorption-type polarizing film and the reflection axis of the reflection-type polarizing film are parallel to each other to obtain a reflection characteristic of the reflection-type polarizing film. Accordingly, the reflection-type polarizing film itself reflects incident light resulting in a bright display. Conversely, a dark state is a state where the transmission axis of the absorption-type polarizing film and the transmission axis of the reflection-type polarizing film are parallel to each other and uses the transmission characteristic, and thus it is required to dispose or print a light absorbing material on the rear face of the reflection-type polarizing film. As above, bright and dark displays with excellent contrast can be performed by means of the liquid crystal display device using the absorption-type polarizing film and the reflection-type polarizing film.

The structure of the conventional liquid crystal display panel of the liquid crystal display device as above is explained with reference to the drawings. FIG. 16 is a plane view showing a plane structure of the principal portion thereof, and FIG. 17 is a partly enlarged sectional view along the A—A line in FIG. 16.

In the liquid crystal display panel, a first substrate 1 and a second substrate 5 made of a transparent material such as glass or the like are oppositely disposed to each other, a predetermined gap between them is kept by a spacer not shown, peripheries of the substrates are bonded together by a sealant 4 serving as an adhesive, and a liquid crystal layer 8 is filled in the gap and sealed by an end-sealing material 26.

M pieces of scanning electrodes 2 made of a transparent electrode film are formed on the inner face of the first substrate 1, N pieces of data electrodes 6 intersecting the scanning electrodes 2 are formed on the inner face of the second substrate 5, and intersections of the scanning electrodes 2 and the data electrodes 6 form pixel portions 21 to form a liquid crystal cell of a matrix type liquid crystal display panel having an M×N piece of pixel portions.

In FIG. 16, since the second substrate 5 positioned on the uppermost side of this liquid crystal cell is transparent, the data electrodes 6, the first substrate 1 and the scanning electrodes 2, the sealant 4, the end-sealing material 26, and the like positioned thereunder are all shown by solid lines.

In the above liquid crystal display panel, there is a liquid crystal display panel of an active-matrix type having a switching element in each pixel portion 21 and a liquid crystal display panel of a passive-matrix type without providing a switching element, and the liquid crystal display panel as the passive-matrix type is explained here.

It should be noted that, as shown in FIG. 17, an alignment layer 3 and an alignment layer 7 are formed on the inner face of the first substrate 1 and the scanning electrodes 2 and on the inner face of the second substrate 5 and the data electrodes 6 respectively in order to align the liquid crystal molecules of the liquid crystal layer 8 regularly.

Moreover, a first polarizing film 11 is disposed on the rear face side of the first substrate 1, which is the side opposite to the observer's side (the visible side: the upper side in FIG. 17) of the liquid crystal cell, and a second polarizing film 12 is disposed on the front face side of the second substrate which is the observer's side.

The first polarizing film 11 is a reflection-type polarizing film and, for example, DBEF (trade name) manufactured by Sumitomo 3M Ltd. is used, and the second polarizing film 12 is an absorption-type polarizing film. On the rear face of the first polarizing film 11, a printed layer 13 of black ink is provided as a light absorbing layer.

The first polarizing film 11 and the second polarizing film 12 are disposed in such a manner that the respective transmission axes are orthogonal to each other, and for the liquid crystal layer 8, used is twisted nematic liquid crystal is used for optically rotating passing light about 90 degrees between the first substrate 1 and the second substrate 5.

Therefore, when the environment is bright where this liquid crystal display panel is used, external light is incident from the front face side of the second substrate 5. Therefore, in a pixel portion for performing a dark display, a first incident ray of light L1 passes through the second polarizing film 12 to become a linearly polarized light, and is optically rotated 90° by the liquid crystal layer 8 and is incident to the reflection-type polarizing film which is the first polarizing film 11 as a light linearly polarized in the direction parallel to the transmission axis thereof, so that the light passes through the first polarizing film 11 and is absorbed by the printed layer 13 on the rear face thereof.

Moreover, as for a bright display, a second incident light L2 passes through the second polarizing film 12 to become a linearly polarized light, optical rotatory of the liquid crystal layer 8 is lost by applying a large voltage to the liquid crystal layer 8, the incident light into the liquid crystal layer passes through without being optically rotated and is incident to the reflection-type polarizing film which is the first polarizing film 11 as a light linearly polarized in the direction parallel to the reflection axis thereof, so that the light is reflected by the reflection-type polarizing film 11 to become a strong reflected light L3 and passes through the liquid crystal layer 8 and the second polarizing film 12 to emit to the visible side.

As above, this liquid crystal display panel performs the dark display by a linearly polarized light being incident to the transmission axis of the reflection-type polarizing film and an absorption characteristic of the printed layer 13 and enables the bright display by a reflection characteristic of the reflection-type polarizing film.

However, since the printed layer 13 provided on the first polarizing film 11 which is the reflection-type polarizing film does not have a transmission characteristic, even if an auxiliary light source is disposed on the rear face side of the reflection-type polarizing film 11, light from the auxiliary light source is absorbed by the printed layer 13 having the absorption characteristic and hence light does not reach the visible side.

If a display is performed using the auxiliary light source without providing the printed layer 13, the bright display using incident light by the external light source becomes a dark display in the display by the auxiliary light source, and conversely, the dark display using incident light by the external light source becomes a bright display in the display by the auxiliary light source. Consequently, brightness and darkness be come reversed between in the reflection-type display using the external light source and in the transmission-type display using the auxiliary light source.

As described above, in the case where the auxiliary light source is used in a dark environment, in the conventional liquid crystal display panel in which a light absorbing layer is provided on the rear face of the reflection-type polarizing film, transmittance of light which the auxiliary light source emits is considerably poor, and thus a display can not be performed. Even when the printed layer is removed to apply light of the auxiliary light source to the visible side, a state where a dark display is performed in the reflection-type display becomes a state where the transmittance is large due to the combination of the absorption-type polarizing film and the reflection-type polarizing film, whereby light of the auxiliary light source passes resulting in a bright display, that is, the display in which brightness and darkness thereof is reversed.

Similarly, a state where a bright display is performed in the reflection-type display becomes a state where the transmittance is small because the transmission axis of the absorption-type polarizing film and the transmission axis of the reflection-type polarizing film are orthogonal to each other, whereby light of the auxiliary light source is shut out resulting in a dark display, that is, the display in which brightness and darkness thereof is reversed.

Further, also in the case where a cholesteric liquid crystal polymer is used in place of the reflection-type polarizing film, the display mode thereof becomes nearly the same as in the case where the reflection-type polarizing film is used.

More specifically, the cholesteric liquid crystal polymer selectively and largely reflects (selective reflection) light within a predetermined wavelength region out of the visible light and transmits light within the other wavelength region. Accordingly, the cholesteric liquid crystal polymer has a large reflection characteristic to the external light source within a wavelength region of the selective reflection and a transmission characteristic within the other wavelength region. Therefore, the bright display is performed using the selective reflection of the cholesteric liquid crystal polymer and the dark display is performed by an absorbing material disposed on the rear face side of the cholesteric liquid crystal polymer.

In the case where the auxiliary light source is turned on, light is shut out within the wavelength region of the selective reflection, resulting in a dark display and light of the auxiliary light source is transmitted within the other wavelength region resulting in a bright display. Accordingly, brightness and darkness of the display are reversed.

As described above, in the case of a conventional translucent-type (transflective) liquid crystal display device using the reflection-type polarizing film and having the auxiliary light source, the display comes to one in which the bright display in the reflection display by the external light source and the bright display in the transmission display by turning on the auxiliary light source are reversed. Moreover, since the printed layer provided on the rear face of the reflection-type polarizing film prevents light from the auxiliary light source from transmitting, it is difficult to concurrently use the transmission display by the auxiliary light source.

Also in the case where the cholesteric liquid crystal polymer is used as a reflector, in the transflective liquid crystal display device having the auxiliary light source, the display comes to one in which the bright display in the reflection display and the bright display in the transmission display by turning on the auxiliary light source are reversed. Furthermore, there is a disadvantage that when the printed layer is provided on the rear face of the cholesteric liquid crystal polymer, light by the auxiliary light source can not be transmitted.

DISCLOSURE OF THE INVENTION

The present invention is made to solve the aforesaid disadvantage, and its object is to make it possible to use emitted light of an auxiliary light source efficiently and to prevent brightness and darkness of a display from being reversed between a reflection display by an external light source and a transmission display by use of the auxiliary light source, thereby realizing a display always with high brightness and excellent visibility, in a liquid crystal display device using a reflection-type polarizing film or a cholesteric liquid crystal polymer film.

To achieve the above object, the present invention provides a liquid crystal display device structured as follows.

A liquid crystal display device of the present invention comprises a liquid crystal cell made by disposing a first substrate provided with scanning electrodes and a second substrate provided with data electrodes in such a manner that the scanning electrodes and the data electrodes are oppositely disposed to each other with a predetermined gap therebetween, and a liquid crystal layer being filled between the first substrate and the second substrate.

Moreover, the second substrate of the liquid crystal cell is disposed on the visible side, a polarizing film is disposed on the side of each face of the first substrate and the second substrate opposite to the face contacting the liquid crystal layer, the polarizing film disposed on the first substrate side is a reflection-type polarizing film, an auxiliary light source is provided on the side of the reflection-type polarizing film opposite to the face on the first substrate side, and a light absorbing layer for transmitting part of light is provided between the reflection-type polarizing film and the auxiliary light source.

Furthermore, means for varying a voltage applied to the liquid crystal layer between the auxiliary light source being turned on and being turned off is provided.

It is preferable that the above means is a circuit for reversing a gradation signal applied to the liquid crystal layer between the auxiliary light source being turned on and being turned off.

Moreover, it is preferable to provide a scattering film having light scattering properties between the reflection-type polarizing film and the light absorbing layer.

It is possible to provide the scattering film adhering to the reflection-type polarizing film.

Furthermore, as the scattering film, it is also possible to bond a plastic film in which asperities are formed on the front face thereof or a plastic film in which beads with different refractive indexes are dispersed to the rear face of the reflection-type polarizing film with an adhesive.

It is preferable to provide a gap between the scattering film and the light absorbing layer.

The light absorbing layer can be made of a printed layer having opening portions with a large transmittance and absorbing portions with a small transmittance.

It is desirable that the light absorbing layer has a plurality of opening portions or portions having a transmission characteristic at a pixel portion.

It is preferable that the light absorbing layer having the opening portions has a grid form in which the opening portions and the absorbing portions are arranged regularly and the printed layer forming the absorbing portions is made of a thick film for absorbing external light by the thickness thereof when an incident angle of the external light becomes large.

The light absorbing layer may have a plurality of opening portions having different transmittances, or the light absorbing layer may be made so that the light absorbing layer as a whole transmits part of light. Alternatively, the light absorbing layer may be made of a plurality of absorbing portions having different spectral characteristics within a visible light region.

Alternatively, it is also possible that liquid crystal display device according to the present invention comprises the same liquid crystal cell as above, wherein the second substrate of the liquid crystal cell is disposed on the visible side, an absorption-type polarizing film is disposed on the side of a face of the second substrate opposite to the face contacting the liquid crystal layer and a cholesteric liquid crystal polymer film is disposed on the side of a face of the first substrate opposite to the face contacting the liquid crystal layer respectively, an auxiliary light source is disposed on the side of a face of the cholesteric liquid crystal polymer film opposite to the face on the first substrate side with a light absorbing layer for transmitting part of light therebetween, and means for varying a voltage applied to the liquid crystal layer between while the auxiliary light source is turned on and while it is turned off is provided.

It is preferable that the above means in this case is also a circuit for reversing a gradation signal applied to the liquid crystal layer between while the auxiliary light source is turned on and while it is turned off.

In this liquid crystal display device, it is preferable that a retardation film is disposed between the second substrate and the absorption-type polarizing film, and a ¼ λ (quarter-wavelength) film is disposed between the first substrate and the cholesteric liquid crystal polymer film respectively.

It is possible that the light absorbing layer is a printed layer having transparency so that the light absorbing layer as a whole transmits part of light.

Alternatively, the liquid crystal display according to the present invention comprises a liquid crystal cell made by disposing a first substrate provided with scanning electrodes and a second substrate provided with data electrodes in such a manner that the scanning electrodes and the data electrodes are opposed to each other with a predetermined gap therebetween, a liquid crystal layer being filled between the first substrate and the second substrate, and a first color filter being provided on the first substrate or the second substrate, in which the second substrate of the liquid crystal cell is disposed on the visible side.

Moreover, an absorption-type polarizing film is disposed on the side of a face of the second substrate opposite to the face contacting the liquid crystal layer and a reflection-type polarizing film is disposed on the side of a face of the first substrate opposite to the face contacting the liquid crystal layer respectively, an auxiliary light source is disposed on the side of a face of the reflection-type polarizing film opposite to the face on the first substrate side with a second color filter therebetween, and means for varying a voltage applied to the liquid crystal layer between the auxiliary light source being turned on and being turned off is provided.

Moreover, it is preferable to provide a scattering film having light scattering properties between the first substrate and the second color filter.

As the scattering film, it is possible to use a plastic film in which asperities are formed on the front face thereof or a plastic film in which beads with different refractive indexes are dispersed.

It is preferable to use the first color filter and the second color filter respectively made of red, green and blue color filters.

It is preferable that the first color filter and the second color filter are provided on one face side of the first substrate and on the other face side respectively and disposed in such a manner that the color filters of the same color overlap one another with the first substrate therebetween in almost the same areas.

It is also possible to provide means for controlling a voltage applied to the liquid crystal layer of the liquid crystal cell to vary brightness of a display of a halftone in accordance with brightness of an external environment.

OPERATION

The printed layer is provided directly on or across a medium such as a film or the like on the rear face of the reflection-type polarizing film used in the liquid crystal display device of the present invention. The printed layer is provided with the opening portions with a large transmittance and the auxiliary light source is disposed on the rear face of the printed layer having the opening portions, whereby in an environment where the external light source as a main light source is bright (the reflection display), a bright display is performed by the use of the reflective characteristic of the reflection-type polarizing film and a dark display is performed by absorption of the printed layer. In a dark environment (the transmission display), the auxiliary light source is turned on and light of the auxiliary light source is applied to the observer's side through the opening portions provided in the printed layer to perform a bright display. In this case, the gradation reversal circuit is switched between during ON and during OFF of lighting of the auxiliary light source on the circuit side, so that a small voltage is applied to the liquid crystal layer in the transmission display at a pixel portion where a large voltage is applied to the liquid crystal layer in the reflection display. Conversely, in the reflection display, a large voltage is applied to the liquid crystal layer in the transmission display at a pixel portion where a small voltage is applied to the liquid crystal layer in the reflection display.

By the gradation reversal circuit, in the reflection display and the transmission display, large on small voltages applied to the liquid crystal layer are reversed and simultaneously a reversal of bright and dark displays occurs by the reflection-type polarizing film, so that the bright display in the reflection display becomes the bright display also in the transmission display in the liquid crystal display device. Especially, as for prevention of the reversal of the bright and dark displays of an image, since information of colors is changed between the reflection display and the transmission display due to the reversal of the bright and dark displays in a color liquid crystal display device using a color filter or the like, the prevention of the reversal of the bright and dark displays is very effective.

Similarly to the above, in the case where the cholesteric liquid crystal polymer film is used on the rear face side of the first substrate, the printed layer is provided directly on or across a medium such as a film on the rear face of the cholesteric liquid crystal polymer film, the printed layer is provided with the opening portions with a large transmittance, and the auxiliary light source is disposed on the rear face of the printed layer having the opening portions, whereby in a bright environment (the reflection display), a bright display is performed by use of the reflection characteristic of the reflection-type polarizing film and a dark display is performed by absorption of the printed layer. In a dark environment, (the transmission display), the auxiliary light source is turned on and light of the auxiliary light source is applied to the observer's side through the opening portions provided in the printed layer to perform a bright display. In this case, the gradation reversal circuit is switched between during ON and during OFF of lighting of the auxiliary light source on the circuit side, so that a small voltage is applied to the liquid crystal layer in the transmission display at a pixel portion where a large voltage is applied to the liquid crystal layer in the reflection display. Conversely, a large voltage is applied to the liquid crystal layer in the transmission display at a pixel portion where a small voltage is applied to the liquid crystal layer in the reflection display.

By the gradation reversal circuit, in the reflection display and the transmission display, large or small voltages applied to the liquid crystal layer are reversed and simultaneously a reversal of bright and dark displays occurs by the cholesteric liquid crystal polymer film, so that the bright display in the reflection display becomes the bright display also in the transmission display in the liquid crystal display device. Especially, as for prevention of the reversal of the bright and dark displays of an image, since information of colors is changed between the reflection display and the transmission display due to the reversal of the bright and dark displays in a color liquid crystal display device using a color filter or the like, the prevention of the reversal of the bright and dark displays is very effective.

Moreover, the first color filter is provided between the first substrate and the second substrate and the second color filter is provided on the rear face of the reflection-type polarizing film or the cholesteric liquid crystal polymer film, whereby in the case of the reflection display, light passes through the first color filter twice to display color information, and in the dark display the second color filter is employed as an absorbing layer by the absorption characteristic thereof. Meanwhile, in the case of the transmission display while the auxiliary light source is turned on, since light passes through the second color filter and the first color filter to display color information, the first color filter can be optimized for the reflection display and chroma of the transmission display can be improved by the second color filter compared with the case where only the first color filter is provided, thereby enabling improvement of both the displays of the reflection display and the transmission display.

It should be noted that since the reflection display requires a bright display, a gradation signal is so set that the halftone thereof is deviated in the bright direction. Thereby, a bright display becomes possible. However, in the case of the transmission display, contrast and chroma are important.

Especially, when the external light source is very dark, since an observer becomes very sensitive to brightness, the gradation signal is so set that the halftone thereof is deviated to black side compared with the reflection display, thereby preventing a large change in display by ON and OFF of lighting of the auxiliary light source. In other words, correction of the gradation signal is changed in accordance with ON and OFF of lighting of the auxiliary light source, thereby making the display quality excellent.

Furthermore, correction of the gradation signal by which halftone is deviated in a bright direction or in a dark direction can be changed depending on the brightness of the environment where the liquid crystal display device is used by the external light source, thereby enabling improvement of the display quality also in the case where the reflection display is performed.

BRIEF DESCRIPTION OF DRAWINGS

FIG. 1 is a view for explaining a display function when an external light source is used, and FIG. 2 is a view for explaining a display function when an auxiliary light source is used;

FIG. 4 is an explanatory view for comparing bright and dark displays between the present invention and the conventional example;

BEST MODE FOR CARRYING OUT THE INVENTION

Hereinafter, the best mode of a liquid crystal display device for carrying out the present invention will be described with reference to the drawings.

First Embodiment

A first embodiment of the liquid crystal display device according to the present invention will be explained with reference to FIG. 1 to FIG. 5 and FIG. 16.

Figure 1:
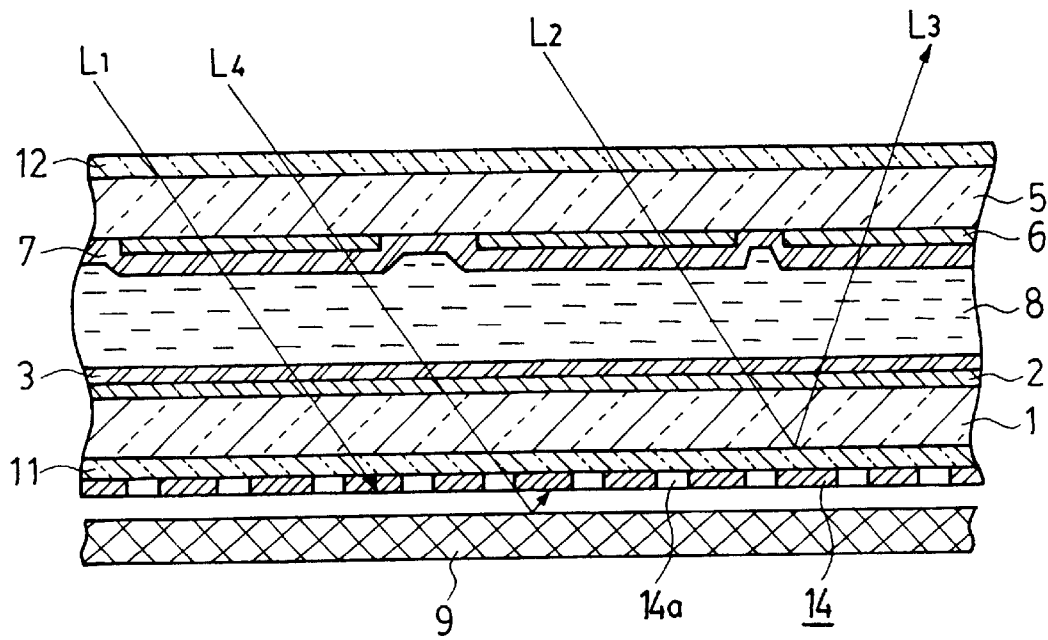
FIG. 1 and FIG. 2 are partly enlarged sectional views, corresponding to a section along the A—A line in FIG. 16, of a liquid crystal display panel of a liquid crystal display device of a first embodiment of the present invention.
Figure 2:
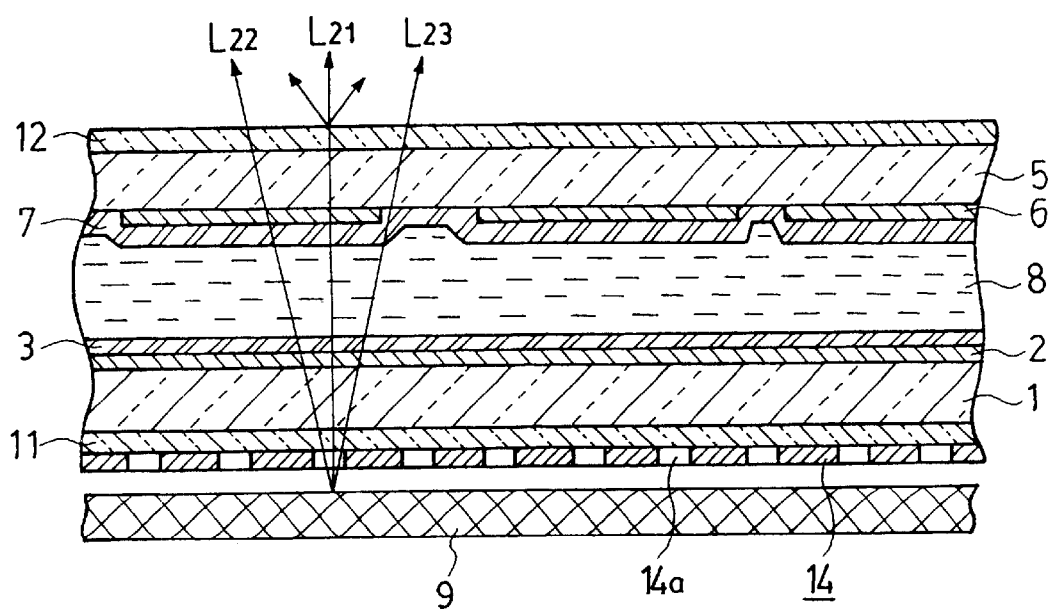
Figure 16:
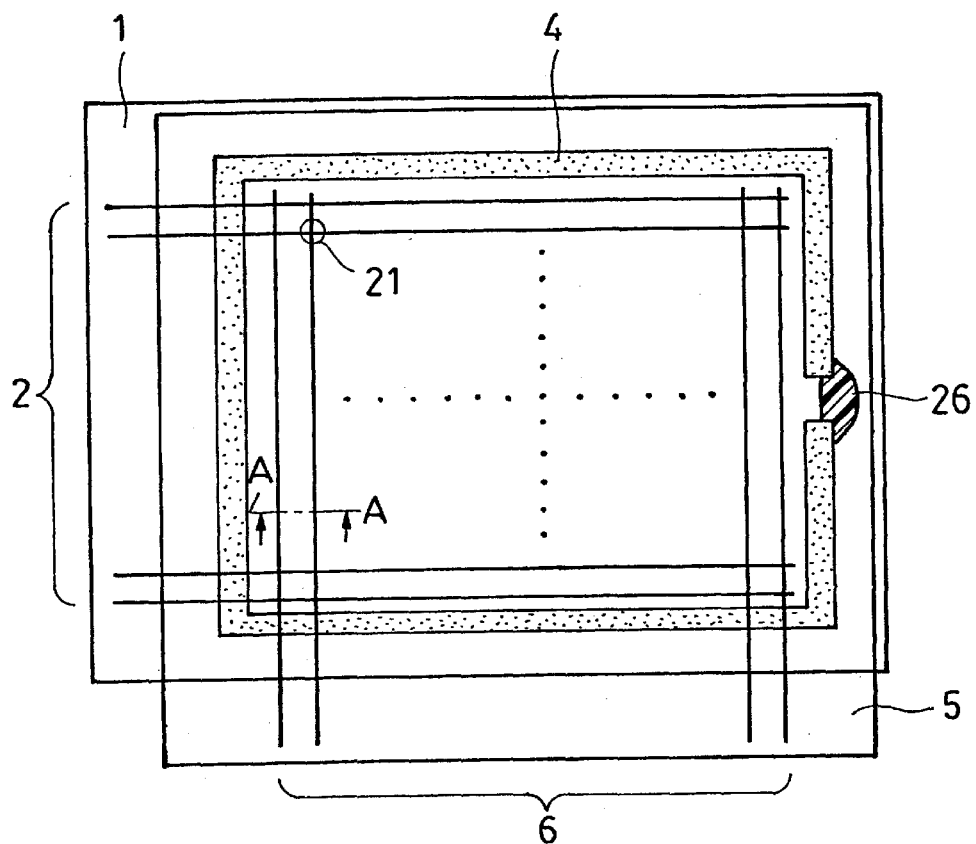
FIG. 16 is a plane view showing an example of the structure of a conventional liquid crystal display device.

FIG. 1 and FIG. 2 are partly enlarged sectional views of a liquid crystal display panel of the liquid crystal display device showing the first embodiment of the present invention and correspond to an enlarged sectional view along the A—A line that in FIG. 16. The plane view showing the basic structure of the liquid crystal display device is the same as in FIG. 16, and thus the illustration thereof is omitted. Incidentally, FIG. 1 is a view for explaining display operations in the case where a display is performed by utilizing an external light source as a main light source, and FIG. 2 is a view for explaining display operations in the case where a display is performed by utilizing an auxiliary light source.

Figure 17:
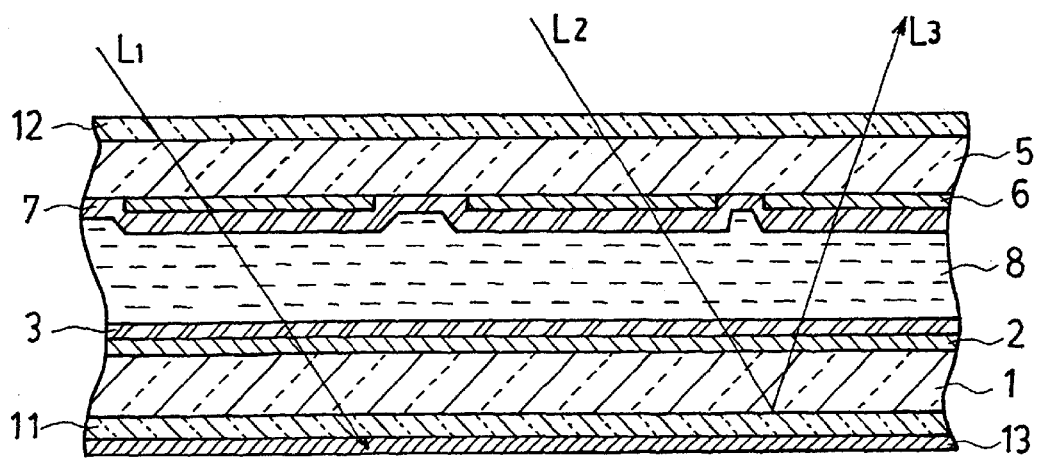
FIG. 17 is a partly enlarged schematic sectional view along the A—A line in FIG. 16.

The liquid crystal display panel of the liquid crystal display device showing the first embodiment of the present invention shown in FIG. 1 and FIG. 2 has the same structure as the liquid crystal display panel that is explained in FIG. 16 and FIG. 17 except that a light absorbing layer provided on the rear face of a first polarizing film 11 is different and an auxiliary light source is provided, but it is explained to make sure.

In this liquid crystal display device, a first substrate 1 and a second substrate 5 made of a transparent material such as glass or the like are oppositely disposed to each other, a predetermined gap between them is kept by a spacer not shown, peripheries of them are bonded together by a sealant 4 serving as an adhesive, and a liquid crystal layer 8 is filled in the gap and sealed by an end-sealing material 26 (Refer to FIG. 16).

Moreover, M pieces of scanning electrodes (signal electrodes) 2 made of a transparent electrode film are formed on the inner face of the first substrate 1, and N pieces of data electrodes (opposed electrodes) 6 intersecting the scanning electrodes 2 are formed on the inner face of the second substrate 5, and intersections of the scanning electrodes 2 and the data electrodes 6 form pixel portions (shown by 21 in FIG. 16) to form a matrix-type liquid crystal display panel having an M×N piece of pixel portions.

The above liquid crystal display panel may be a liquid crystal display panel of an active-matrix type having a switching element in each pixel portion or a liquid crystal display panel of a passive-matrix type without providing a switching element, and the liquid crystal display panel as the passive-matrix type is explained here.

An alignment layer 3 and an alignment layer 7 are formed on the inner face of the first substrate 1 and the scanning electrodes 2 and on the inner face of the second substrate 5 and the data electrodes 6 respectively in order to align the liquid crystal molecules of the liquid crystal 8 regularly.

Moreover, a first polarizing film 11 (hereinafter referred to as a reflection-type polarizing film 11) which is a reflection-type polarizing film is disposed on the rear face side of the first substrate 1, which is the side opposite to the observer's side (the visible side: the upper side in FIGS. 1 and 2) of the liquid crystal cell, and a second polarizing film 12 (hereinafter referred to as a absorption-type polarizing film 12) which is an absorption-type polarizing film is disposed on the front face side of the second substrate which is the observer's side.

The reflection-type polarizing film 11 and the absorption-type polarizing film 12 are arranged in such a manner that respective transmission axes are orthogonal to each other. For the liquid crystal layer 8, twisted nematic liquid crystal is used, for optically rotating passing light about 90 degrees between the first substrate 1 and the second substrate 5.

Moreover, a printed layer 14 which has many opening portions 14a with a large transmittance and which is a light absorbing layer made by printing with black ink except for the opening portions 14a with high transmittance is provided on the rear face of the reflection-type polarizing film 11. The opening portions 14a are formed by offset-printing dot shapes with ink having resinous pigment or by sucker-rubber printing, screen-printing in mesh, applying with a spray, or by forming them through a photolithography using a photoresist resin when the printed layer 14 is formed on the reflection-polarizing film 11.

An auxiliary light source 9 is disposed on the rear face side of the printed layer 14 with a slightly spaced gap therebetween. It is preferable to use a planer light-emitting element which emits light with uniform intensity over the entire liquid crystal display panel, for example, an electroluminescent (EL) light as the auxiliary light source 9.

Display operations of the liquid crystal display panel will now be explained.

When the environment is bright where the liquid crystal display panel is used, external light used as the main light source is incident from the front face of the second substrate on the visible side to the liquid crystal display panel as shown in FIG. 1. Therefore, at a pixel portion for performing a dark display, a first incident ray of light L1 passes through the absorption-type polarizing film 12 to become a linearly polarized light, is optically rotated 90° by the liquid crystal layer 8 and is incident to the reflection-type polarizing film 11 as a light linearly polarized in the direction parallel to the transmission axis thereof, so that the light passes through the reflection-type polarizing film 11 and is absorbed by the printed layer 14 at a portion where the opening portion 14a is not provided.

Further, an incident light L4 which passes through the opening portion 14a in the printed layer 14 disposed on the rear face of the reflection-type polarizing film 11 passes through the opening portion 14a and thereafter part of the light is reflected by the auxiliary light source 9 disposed on the rear face side of the printed layer 14 to be emitted to the printed layer 14 side again, but it is absorbed by the printed layer 14 and hence it does not reach the visible side. As described above, leaking light in a dark display of the incident light L4 passing through the opening portion 14a which has not been absorbed by the printed layer 14 is also absorbed by the printed layer 14 around the opening portion 14a, whereby the dark display does not deteriorate.

Moreover, as for a bright display, a second incident light L2 passes through the absorption-type polarizing film 12 to become a linearly polarized light and passes through, without being optically rotated, a portion of the liquid crystal layer 8 where optical activity thereof is lost by a large voltage being applied to the liquid crystal layer 8, and is incident to the reflection-type polarizing film 11 as a light linearly polarized in the direction parallel to the reflection axis thereof, whereby the light is reflected by the reflection-type polarizing film 11 to become a strong reflected light L3 and passes through the liquid crystal layer 8 and the absorption-type polarizing film 12 to go out to the visible side (the upper side in FIG. 1).

As above, for the bright and dark displays utilizing the external light source, it becomes possible that the dark display is performed by the linearly polarized light being incident to the transmission axis of the reflection-type polarized film 11 and the absorption characteristic of the printed layer 14 and the bright display is performed by the reflection characteristic of the reflection-type polarizing film 11.

Meanwhile, when the environment is dark where the liquid crystal display panel is used, the auxiliary light source 9 is turned on, whereby lights L21, L22 and L23 are emitted from the auxiliary light source 9 to the first substrate 1 side as shown in FIG. 2. Though part of the emitted light from the auxiliary light source 9 is absorbed by the printed layer 14, the light passing through the opening portion 14a passes through the first substrate 1, the liquid crystal layer 8, the second substrate 5 and the absorption-type polarizing film 12 to go out to the visible side (the upper side in FIG. 2), resulting in the bright display.

The outgoing light from the absorption-type polarizing film 12 is diffused and goes out as shown by the light L21 by providing a front diffusing layer (not shown) containing plastic beads in a photoresist on the front face of the absorption-type polarizing film 12, thereby enabling an excellent display without depending on a viewing angle.

At the portion of the liquid crystal layer 8 where the optical rotatory thereof is lost by a voltage being applied to the liquid crystal layer 8, the light which is emitted from the auxiliary light source 9 and passes through the opening portion 14a of the printed layer 14 passes through the reflection-type polarizing film 11 to become a linearly polarized light and passes through the liquid crystal layer 8 without being optically rotated to be incident to the absorption-type polarizing film 12 as a light linearly polarized in the direction parallel to the absorption axis thereof, so that the light is absorbed by the absorption-type polarizing film 12 and hence it does not go out to the visible side, resulting in a dark display.

To solve reversal of brightness and darkness of a display between the reflection display by the extraneous light and in the transmission display by the auxiliary light source as above, a gradation signal which is applied to the data electrodes 6 is reversed by a drive circuit for driving the liquid crystal display panel synchronously with turning on the auxiliary light source 9. Thereby, when the transmission display is performed by the auxiliary light source 9, a gradation of bright and dark displays are reversed in relation to the reflection display utilizing the external light, thereby preventing brightness and darkness of a display from being reversed between the reflection display using the external light and the transmission display using the auxiliary light source 9.

Figure 3:
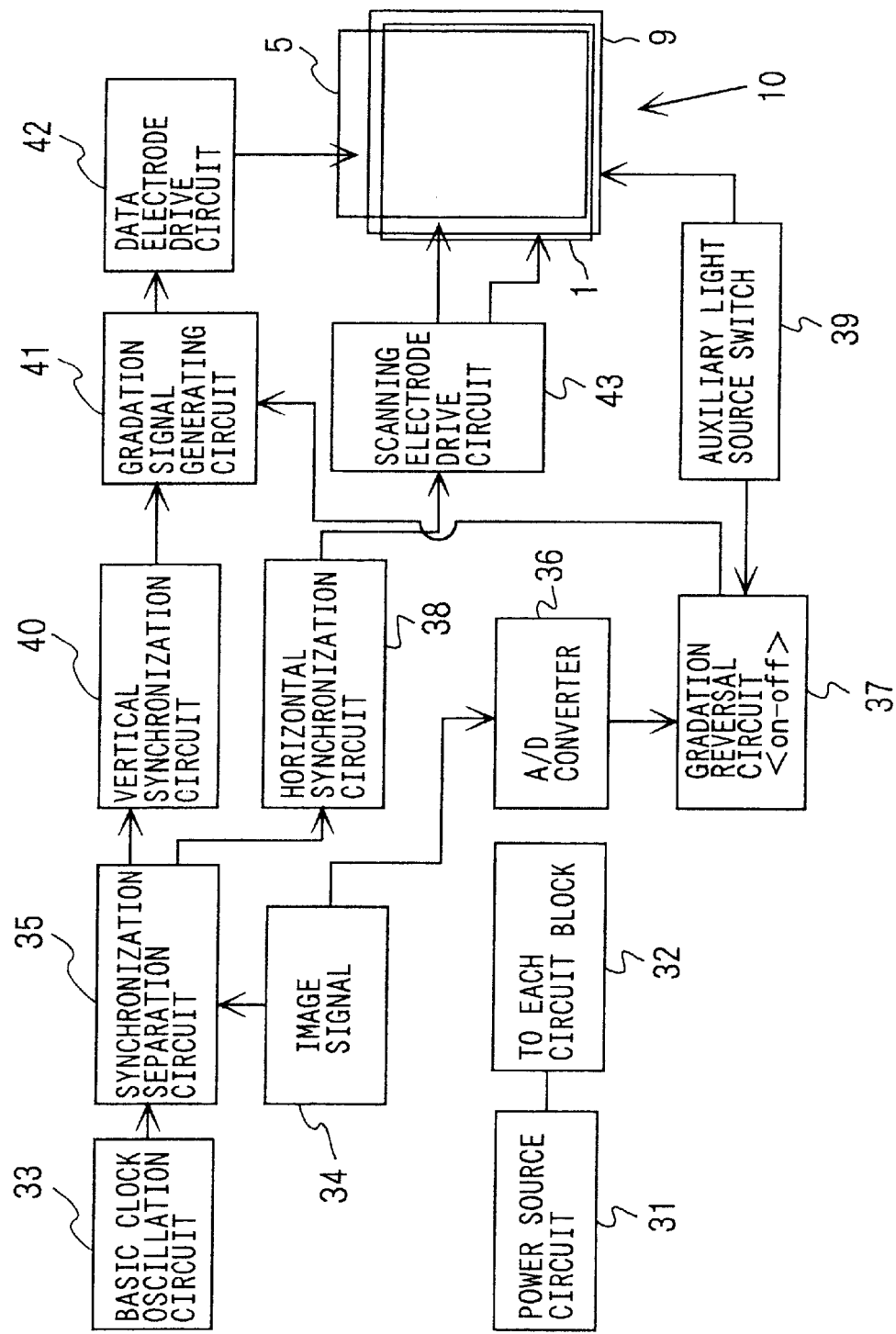
FIG. 3 is a block diagram of a drive circuit provided in the liquid crystal display device of the first embodiment of the present invention.

Thus, a block diagram of the drive circuit of the liquid crystal display device used for this embodiment is shown in FIG. 3 and will now be explained.

In the drive circuit of the liquid crystal display device, an electric source voltage suitable for each block is generated in a power source circuit 31 for causing each circuit block to operate and supplied to each circuit block 32. A basic clock signal is produced by a basic clock oscillation circuit 33 which is a time operation standard of a circuit and applied to a vertical synchronization circuit 40 and a horizontal synchronization circuit 38 through a synchronization separation circuit 35 in response to an input of an image signal 34. Moreover, to generate a gradation (bright and dark) signal which is applied to the liquid crystal layer 8 in response to the image signal 34, a signal that is the image signal A/D-converted by an A/D converter 36 is input to a gradation reversal circuit 37 for reversing a gradation signal depending on use of the external light or use of the auxiliary light source 9.

Moreover, an output signal of the gradation reversal circuit 37 is input to a data electrode drive circuit 42 as a gradation signal through a gradation signal generating circuit 41 to apply a gradation signal of a voltage waveform for performing bright and dark displays on the data electrodes on the second substrate 5 of a liquid crystal display panel 10.

Furthermore, an output signal of the horizontal synchronization circuit 38 is input to a scanning electrode drive circuit 43 to apply a predetermined voltage waveform from the scanning electrode drive circuit 43 to select a plurality of scanning electrodes on the first substrate 1 of the liquid crystal display panel 10 in a time sequence.

Due to the above drive circuit, the gradation reversal circuit 37 is switched by a setting of ON and OFF of the auxiliary light source switch 39 to control reversal/non-reversal of a gradation signal, thereby performing the reflection display through the use of the external light source and the transmission display by turning on the auxiliary light source 9 on the liquid crystal display panel 10 without producing the reversal of brightness and darkness.

The liquid crystal display device for a monochrome display in which a color filter is not provided is explained in the first embodiment. However, even when a color filter is provided, the printed layer 14 having the opening portions 14a and the gradation reversal circuit 37 are provided in the case where the external light source is utilized and in the case where the auxiliary light source 9 is used as in the first embodiment and the gradations are reversed between each other in the case where the external light source is utilized and in the case where the auxiliary light source 9 is used, thereby making it possible that a must-be bright display is the bright display and a must-be dark display is the dark display in both displays.

Next, reverse displays of the bright and dark displays of the liquid crystal display device will be described. FIG. 4 is a view showing states of displays of the reflection-type display using the external light and the transmission-type display using the auxiliary light source in a conventional example (Y) and in an embodiment (X) of the present invention of liquid crystal display devices. The reversal of the bright and dark displays of the liquid crystal display device will be explained with FIG. 4.

First, when the external light source is utilized, in displays in the liquid crystal display devices of this embodiment (X) and the conventional example (Y), squares 60, triangles 61 and circles 62 are displayed in order of brightness on display screens 59 with the maximum brightness. More specifically, when the external light source is utilized, displays of this embodiment (X) and the convention example (Y) are the same. In this case, each of them uses the reflection characteristic of the reflection-type polarizing film within a region where the brightness is high and uses the transmission characteristic of the reflection-type polarizing film and the absorption characteristic of the printed layer provided on the rear face of the reflection-type polarizing film within a region where the brightness is low.

Next, a case where the external environment becomes dark and thus turning on the auxiliary light source 9 is required is explained. The auxiliary light source is automatically turned on by detecting light in the external environment by means of a photosensor or has a function for automatically turning on depending on a positional relation between an observer and the liquid crystal display device by means of an angle sensor. Alternatively, the observer can turn on the auxiliary light source 9 through an operation of turning the auxiliary light source switch 39 in FIG. 3 ON as required.

By turning on the auxiliary light source, since the printed layer is provided on the entire surface of the rear face of the reflection-type polarizing film in the conventional example (Y), the light from the auxiliary light source is absorbed largely. However, the printed layer is given a transmission characteristic, whereby in the case where the light of the auxiliary light source passes through the reflection-type polarizing film, the liquid crystal layer and the second polarizing film to go out to the observer's side, the light of the auxiliary light source strongly goes out to the observer's side within a region where the transmittance thereof is large (a dark display region) when the external light is utilized, resulting in a bright display. The light of the auxiliary light source is shut within a region where the reflection characteristic is strong (a bright display region) when the external light source in utilized, resulting in a dark display.

As shown in FIG. 4, a circle 66, a triangle 65 and a square 64 are displayed in order of brightness in a dark display screen 63 by turning on the auxiliary light source in the conventional example (Y). In other words, the brightness order of the square 60, the triangle 61 and the circle 62 when the external light source is utilized is changed into a reverse brightness order (reversal of brightness and darkness) of the circle 66, the triangle 65 and the square 64 when the auxiliary light source is used.

As compared with the above, in this embodiment, the printed layer disposed on the rear face of the reflection-type polarizing film is provided with opening portions with a large transmittance, so that the amount of light going out to the observer's side can be increased by turning on the auxiliary light source. Moreover, the gradation reversal circuit 37 is provided to reverse a gradation signal while the auxiliary light source is turned on. Therefore, a small voltage is applied to pixel portions while the auxiliary light source is turned on which apply a large voltage to the liquid crystal layer while the external light source is utilized, and conversely a large voltage is applied to pixel portions while the auxiliary light source is turned on which apply a small voltage to the liquid crystal layer while the external light source is utilized.

Figure 5:
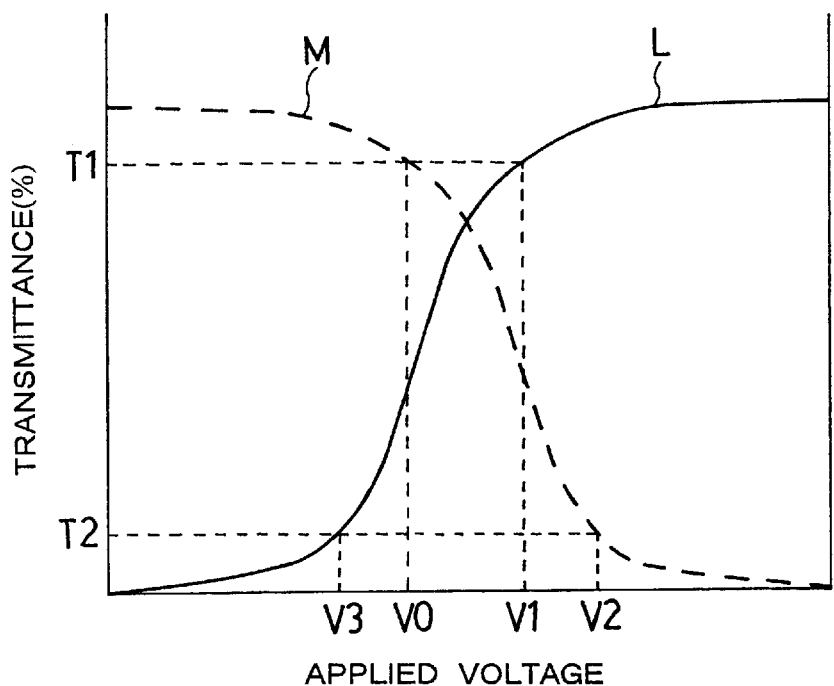
FIG. 5 is a diagram showing relations between applied voltage and transmittance of a liquid crystal showing a gradation display in a display.

Next, operations of the gradation reversal circuit 37 of this embodiment is explained using FIG. 5 which is a diagram showing a relation between the voltage applied to the liquid crystal layer and the transmittance.

The characteristics of the applied voltage and the transmittance when the external light source is utilized are shown by a solid line L and the characteristics when the auxiliary light source is used are shown by a broken line M. It is preferable to show brightness by the reflectance when the external light source is utilized, but it is shown by the transmittance for convenience. The difference in brightness of a display by the liquid crystal display panel is displayed by the gradation and controlled by the voltage applied to the liquid crystal layer.

As shown in FIG. 5, the voltage applied to the liquid crystal layer in the case of a large transmittance T1 is an applied voltage V1 on the curved line L and an applied voltage V0 on the curved line M, and V1 is larger than V0. Conversely, the voltage applied to the liquid crystal layer in the case of a small transmittance T2 is an applied voltage V3 on the curved line L and an applied voltage V2 on the curved line M, and V2 is larger than V3.

As described above, the voltages showing the equivalent transmittance are reversed between the characteristics shown by the curved line L and the characteristics shown by the curved line M. Therefore, the gradation reversal circuit is a circuit for correcting the voltage applied to the liquid crystal so as to make the transmittances equivalent for the case when the external light source is utilized and for the case when the auxiliary light source is used.

Moreover, the applied voltages are reversed between the case where the external light source is used and the case where the auxiliary light source is used and additionally different relations between the gradation and the applied voltage are utilized so that the gradation is concentrated in a direction to increase the transmittance when the external light source in utilized and the applied voltage is divided to be averaged entirely when the auxiliary light source is used, thereby performing a bright display in the case where the external light source is utilized for which brightness is especially required.

As described above, in the conventional liquid crystal display device, the reversal of the bright and dark displays occurs between the display using the external light source and the display using the auxiliary light source. However, in the liquid crystal display device of this embodiment, the reversal of the bright and dark displays does not occur by virtue of the operation of the gradation reversal circuit. Moreover, the printed layer provided on the rear face of the reflection-type polarizing film has the opening portions, thereby enabling a bright display when the auxiliary light source is used.

Furthermore, as shown in FIG. 1, in the case where the light from the external light source passes through the absorption-type polarizing film 12, the liquid crystal layer 8 and the reflection-type polarizing film 11, and further passing through the opening portion 14a provided in the printed layer 14 to reach the auxiliary light source 9, it is preferable that an electro-luminescent (EL) light is used for the auxiliary light source 9 and the surface of the EL light is subjected to low-reflection processing to be made a surface with low reflection strength. Alternatively, the surface of the EL light is given scattering properties and a relation between the observer and the incident light and a relation between the area of the opening portion 14a and the area of the printed layer 14 around the opening portion 14a are used, thereby decreasing the reflected light from the front face of the auxiliary light source 9.

Second Embodiment

The second embodiment of the liquid crystal display device according to the present invention is explained with reference to FIG. 6 and FIG. 7.

Figure 6:
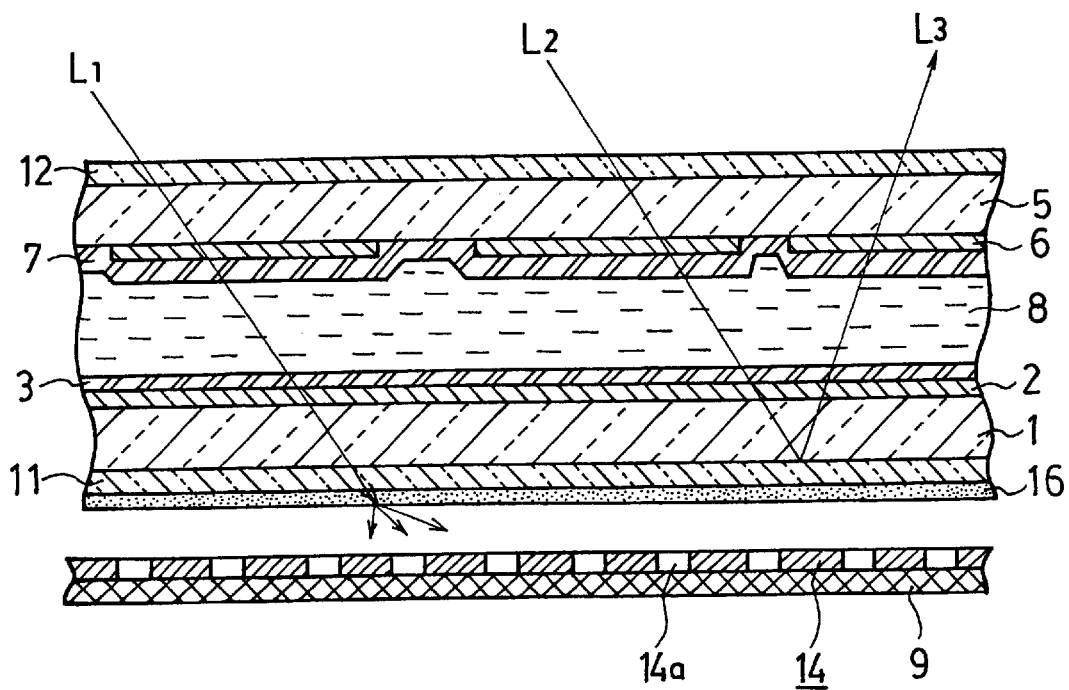
FIG. 6 and FIG. 7 are sectional views similar to FIG. 1 and FIG. 2 of the liquid crystal display panel of the liquid crystal display device of a second embodiment of the present invention.
Figure 7:
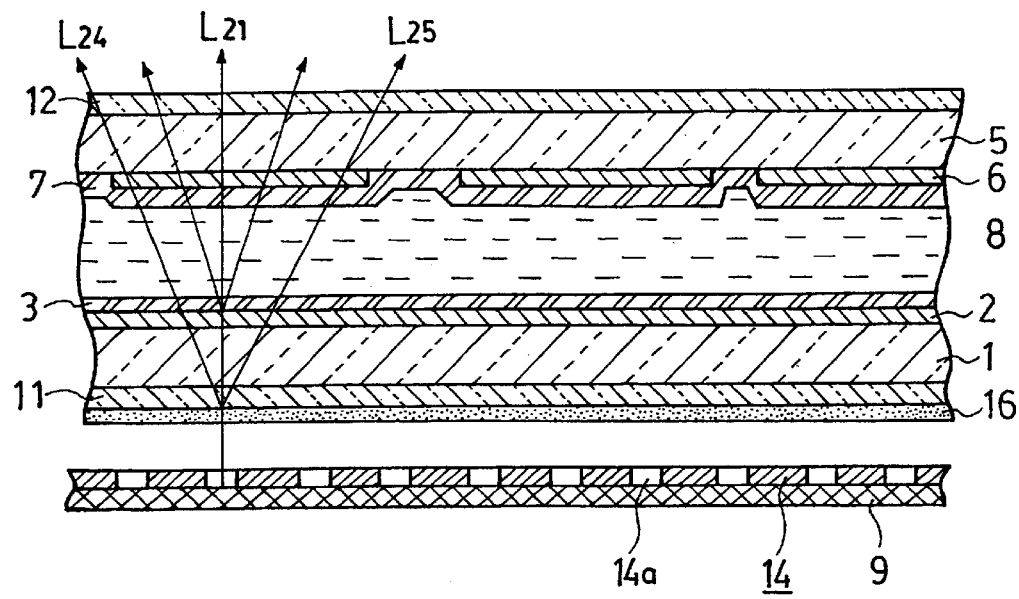

FIG. 6 and FIG. 7 are partly enlarged sectional views of the liquid crystal display device showing the second embodiment of the present invention and correspond to an enlarged sectional view along the A—A line in FIG. 16. The plane view showing the basic structure of the liquid crystal display device is also the same as FIG. 16, and thus the illustration thereof is omitted. FIG. 6 is a view for explaining display operations in the case where a display is performed using an external light source as a main light source, and FIG. 7 is a view for explaining display operations in the case where a display is performed using an auxiliary light source.

The points of the liquid crystal display panel of this embodiment differ from those in the liquid crystal display panel of the aforesaid first embodiment, in that a scattering film 16 is disposed on the rear face of a reflection-type polarizing film 11 as the first polarizing film, and a printed layer 14 having opening portions 14a is provided on an auxiliary light source 9 on the rear face side of the scattering film 16 with a predetermined gap therebetween. This is for the sake of reinforcing the strength of the printed layer 14.

For the auxiliary light source 9, an EL light may be used as in the first embodiment, but a light source composed of a cold-cathode tube and a light guide film is used in this embodiment.

On the rear face of the printed layer 14, a light emitting element is not directly provided and the light guide film is disposed, and a main light source portion of the auxiliary light source 9 is provided around the liquid crystal display panel, whereby reflection from the front face of the auxiliary light source 9 can be prevented when the external light source is utilized.

Moreover, the printed layer 14 in this embodiment employs a structure having an opaque portion in grating form (in grid form) and the opening portions 14a. More specifically, the printed layer 14 is made of a thick photoresist mixed with a black pigment having a thickness of 10 $\mu$m and the width of a printed portion thereof is made 15 $\mu$m and the width of the opening portion 14a is made 3 $\mu$m by a photolithography method. When moiré occurs due to width of the scanning electrode and the width of the data electrode at the pixel portion, the width of the printed portion of the printed layer 14 and the width of the opening portion 14a thereof are changed.

The other structure of the liquid crystal display panel of the second embodiment is the same as that of the first embodiment, and thus the description thereof is omitted.

The liquid crystal display panel of this embodiment uses the opaque portions (printed portions) in grating form and the opening portions 14a of the printed layer 14, whereby when the incident angle of the light from the external light source tilts 30 degrees or more in relation to a perpendicular line of the absorption-type polarizing film 12, the light is absorbed due to the thickness of the printed layer 14 and hence it does not reach the front face of the auxiliary light source 9. Therefore, an excellent contrast ratio can be obtained when the external light source is utilized by suitable positioning of the main light source of the auxiliary light source 9 and employment of the printed layer 14 in grating form having the opening portions 14a.

Relations between the reflection axis of the reflection-type polarizing film 11, the transmission axis of an absorption-type polarizing film 12 and the liquid crystal layer 8 are the same as in the first embodiment.

Therefore, when the environment is bright where the liquid crystal display panel is used, as shown in FIG. 6, a first incident ray of light L1 at a dark display portion passes through the reflection-type polarizing film 11 through the same path as in the case of the first embodiment and becomes a scattered light by the scattering film 16 having light scattering properties to be absorbed by the printed layer 14.

The gap is provided between the scattering film 16 and the printed layer 14, whereby the scattered light is absorbed efficiently by the printed layer 14 in grating form.

A second incident light L2 at a bright display portion is reflected by the reflection-type polarizing film 11 as in the first embodiment and becomes a strongly reflected light L3 to go out to the visible side.

As described above, in the bright and dark displays when the external light source is used, the dark display is performed by the linearly polarized light being incident to the transmission axis of the reflection-type polarizing film 11 and the absorption characteristic of the printed layer 14, and the bright display is performed by the reflection characteristic of the reflection-type polarizing film 11.

Next, when the environment is dark where the liquid crystal display panel is used, as shown in FIG. 7, the auxiliary light source 9 is turned on, whereby a light L21, which the auxiliary light source 9 emits goes out to the first substrate 1 side. In this case, the light from the auxiliary light source 9 decreases in divergence angle, and the light passing through the opening portion 14a of the printed layer 14 is scarcely absorbed at a midpoint by the printed layer 14 in grating form and scattered as scattered lights L24 and L25 by the scattering film 16 disposed on the rear face of the reflection-type polarizing film 11, and further passes through the liquid crystal layer 8 and the absorption-type polarizing film 12 to go out to the visible side, thereby enabling a bright display.

As for the scattering film 16, a plastic plate made by forming asperities on the surface of plastic, or by mixing beads with different refractive indexes in plastic is bonded to the rear face of the reflection-type polarizing film 11 with an adhesive.

However, only with the above structure, the bright and dark displays are reversed in the case of the display using the auxiliary light source 9 in relation to the case of the reflection display using the external light source, by the characteristics of the reflection-type polarizing film 11, the liquid crystal layer 8 and the absorption-type polarizing film 12 as described in the description of the first embodiment.

Therefore, a drive circuit having a gradation reversal circuit 37 as shown in FIG. 3 is provided to drive the liquid crystal display panel as in the case of the first embodiment, the gradation reversal circuit is operated when the auxiliary light source is turned on to reverse a gradation signal applied to data electrodes of a liquid crystal display panel 10, thereby preventing the bright and dark displays from being reversed between the case where the external light source is used and the case where the auxiliary light source 9 is used.

Third Embodiment

The third embodiment of the present invention is explained with reference to FIG. 8 to FIG. 10.

Figure 8:
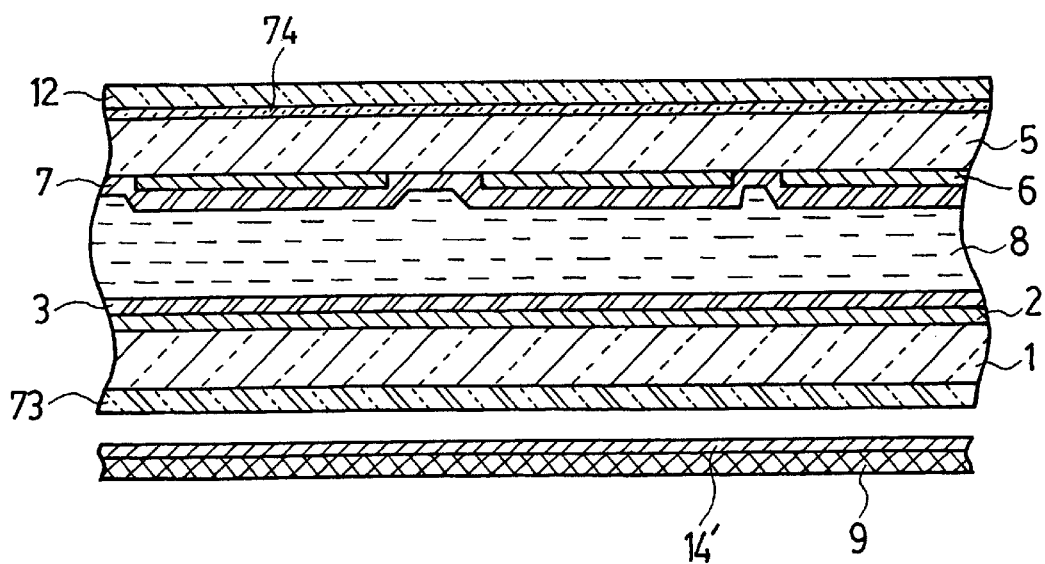
FIG. 8 is a sectional view similar to FIG. 1 showing the liquid crystal display panel of the liquid crystal display device of a third embodiment of the present invention.

FIG. 8 is a partly enlarged sectional view of a liquid crystal display panel of the liquid crystal display device of the third embodiment of the present invention and corresponds to an enlarged sectional view along the A—A line in FIG. 16. The plane view showing the basic structure of the liquid crystal display device is also the same as that in FIG. 16 and thus the illustration thereof is omitted.

Figure 9:
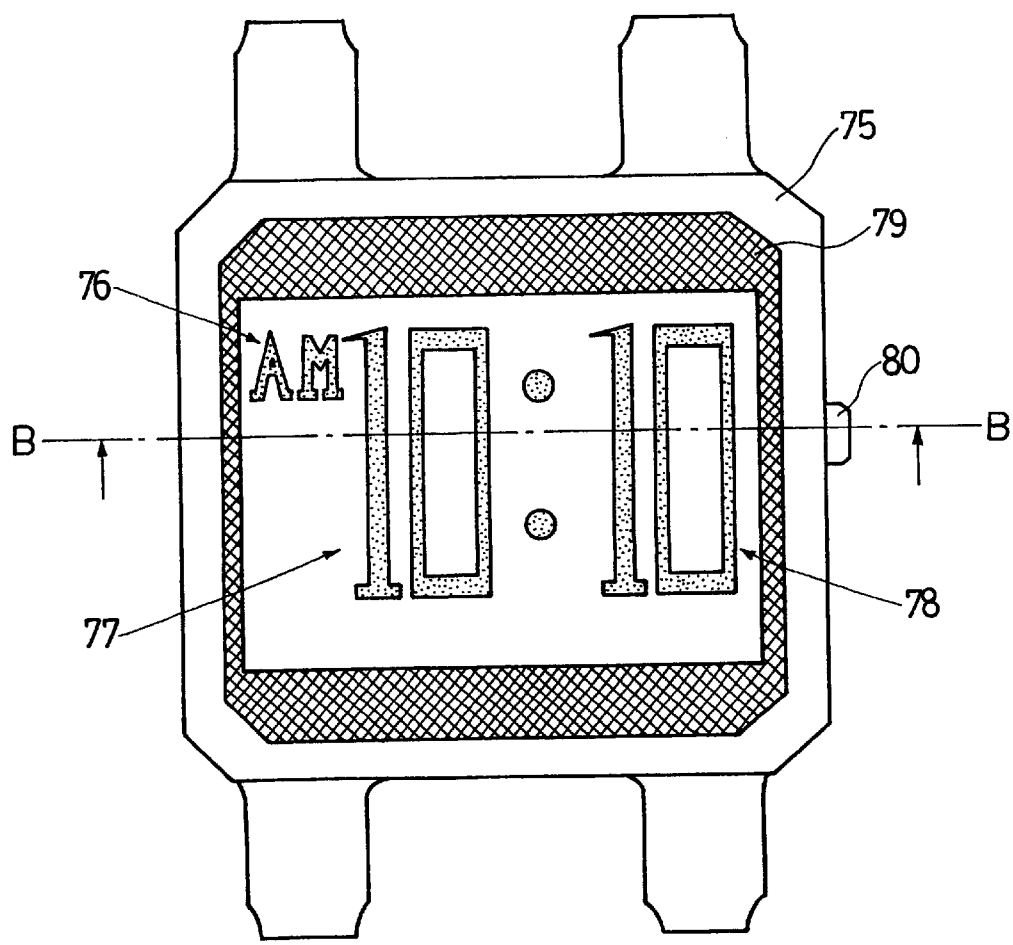
FIG. 9 is a schematic plane view of a wristwatch in which the liquid crystal display device shown in FIG. 8 is installed.
Figure 10:
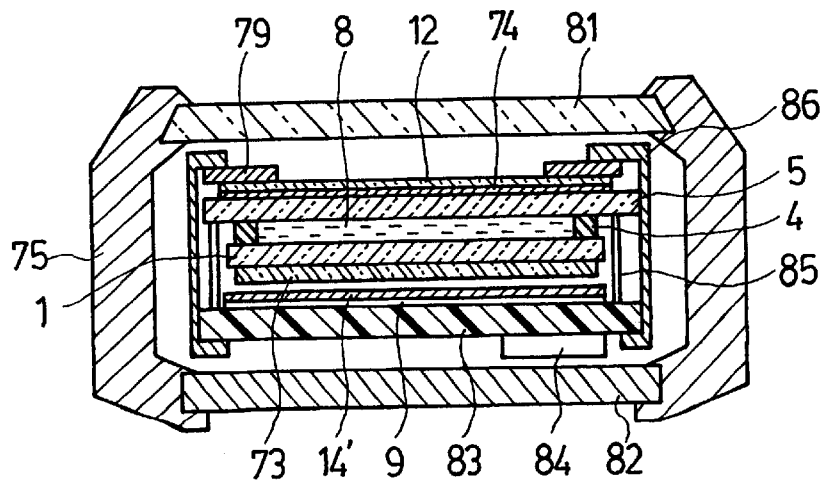
FIG. 10 is a sectional view along the B—B line in FIG. 9.

FIG. 9 is a schematic plane view of a wristwatch in which the liquid crystal display device of the third embodiment is installed, and FIG. 10 is a sectional view along the B—B line in FIG. 9.

The liquid crystal display panel of the third embodiment is explained only about the points differing from the liquid crystal display panel of the first embodiment.

A super twisted nematic (STN) liquid crystal layer 8 is used as a liquid crystal layer 8 filled in a gap between a first substrate 1 and a second substrate 5. Moreover, alignment films 3 and 7 are provided on the first substrate 1 and the second substrate 5 to align liquid crystal molecules of the STN liquid crystal layer regularly, and further the alignment films 3 and 7 are subjected to rubbing processing. Furthermore, a chiral material is added to twist the liquid crystal.

As shown in FIG. 8, a retardation film 74 is provided on the second substrate 5 to prevent the STN liquid crystal layer 8 from being colored, and an absorption-type polarizing film 12 is disposed thereon (on the visible side). Moreover, a quarter-wavelength film (not shown) for adjusting polarization characteristics of the STN liquid crystal layer 8 and a cholesteric liquid crystal polymer film 73 capable of selectively reflecting light within a visible light region are provided on the rear face side of the first substrate 1.

The cholesteric liquid crystal polymer film 73 has a reflection characteristic in a strong metallic tone selectively to light incident from the second substrate 5 side and is capable of efficiently transmitting light with a wavelength except for the selectively reflecting region. Therefore, a difference is given to chromaticity (x, y values) of a printed layer 14' provided on the rear face side of the cholesteric liquid crystal polymer film 73 from chromaticity of the selectively reflecting region of the cholesteric liquid crystal polymer film 73, or brightness (an L value) of the printed layer 14' is made lower than brightness of the cholesteric liquid crystal polymer film 73, thereby enabling a display excellent in visibility.

The selectively reflecting wavelength region of light of the cholesteric liquid crystal polymer film 73 changes depending on a positional relation between a direction in which light is incident to the cholesteric liquid crystal polymer film 73 and an observer. This is because a relative thickness of the cholesteric liquid crystal polymer film 73 changes depending on an incident angle of light.

For instance, in the case where the cholesteric liquid crystal polymer film 73 for selectively reflecting a yellow wavelength is used, since yellow changes to green depending on the direction of the observer, a printed layer 14' with a wavelength region different from yellow and green or with low brightness including a yellow wavelength is used for the printed layer 14'.

In this third embodiment, opening portions are not particularly formed in the printed layer 14', and a printed layer having transparency is employed so that the printed layer 14' transmits part of light within the visible light region. In other words, the entire surface of the printed layer 14' is made to transmit part of light.

Through the use of the cholesteric liquid crystal polymer film 73, the liquid crystal display panel of this embodiment can use the mirror-like selectively reflection characteristic of the visible wavelength region and has a transmission characteristic except for the selectively reflecting wavelength region, so that a display with an excellent contrast ratio becomes possible by giving a difference between the chromaticity (x, y) of the printed layer 14' provided on the case back side of the first substrate 1 and the chromaticity (x, y) of the selectively reflecting region.

The brightness (L) of the printed layer 14' is decreased, whereby the selectively reflection characteristic of the cholesteric liquid crystal polymer film 73 has a characteristic of a metallic tone, so that it becomes possible to use the reflection characteristic of the cholesteric liquid crystal polymer film 73 efficiently by decreasing the reflection characteristic of the printed layer 14'.

In the case where a display is performed by this liquid crystal display panel using the external light source, the display is performed by the selectively reflection characteristic and the transmission characteristic of the cholesteric liquid crystal polymer film 73. Therefore, the bright display is performed by the selective reflection by means of the cholesteric liquid crystal polymer film 73 and the dark display is performed by the absorption characteristic of the printed layer 14' disposed on the rear face of the cholesteric liquid crystal polymer film 73 owing to the transmission characteristic or by the difference in chromaticity.

However, in the case where the display is performed using the difference in chromaticity, when the reversal of the bright and dark displays by turning on the auxiliary light source 9 is prevented, light absorption occurs because of a difference between an emitting light wavelength of the auxiliary light source 9 and a transmitting wavelength of the printed layer 14', resulting in a decrease in brightness. Therefore, means for preventing the reflection characteristic of the printed layer 14' is employed. More specifically, a resin containing carbon is used and the amount of carbon contained in the resin is controlled to have an average absorption characteristic within the visible light region, thereby controlling the whole transmittance.

The emitting light wavelength of the auxiliary light source 9 provided on the rear face side of the printed layer 14' is matched with the selecting wavelength of the cholesteric liquid crystal polymer film 73 so that the light which is almost the same as the selectively reflection characteristic of the cholesteric liquid crystal polymer film 73 goes out to the observer at the transmitting portion of the cholesteric liquid crystal polymer film 73 by turning on the auxiliary light source 9. Conversely, the light within the selecting wavelength region comes into a dark display because the light emitted by turning on the auxiliary light source 9 is shut off, resulting in a display reversed from that in the case where the external light source is utilized.

Therefore, a gradation reversal circuit is used as in the liquid crystal display device in each of the aforesaid embodiments and further the emitting light wavelength of the auxiliary light source 9 is made almost the same as the reflection characteristic of the cholesteric liquid crystal polymer film 73, thereby preventing the reversal of the display by the external light source and the auxiliary light source 9.

As is clear from the above description, this liquid crystal display device uses a display mode for reflecting part of the wavelength region of the visible light and for transmitting or absorbing the light within the other wavelength region.

For instance, in the case where the liquid crystal display device using the cholesteric liquid crystal polymer film 73 as in this embodiment, when the external light source is used, a display is performed by bright colors within the selectively reflecting region and absorption by the printed layer 14' provided on the rear face of the cholesteric liquid crystal polymer film 73 or by the difference in chromaticity.

In this case, the selectively reflecting pixel portions displaying a bright color come into a dark display by turning on the auxiliary light source 9 because the transmittance thereof is low compared with that of a pixel portions in a reverse dark color, resulting in a reversal of the bright and dark displays.

Therefore, as shown in the third embodiment, the emitting light wavelength of the auxiliary light source 9 is selected, the printed layer 14' has a light transmitting characteristic, and the gradation reversal circuit operating synchronously with turning on the auxiliary light source 9 is employed, thereby achieving a display with excellent visibility for the observer without occurrence of a reversal of bright and dark displays in the reflection display using the external light source and in the transmission display using the auxiliary light source 9.

An embodiment in which the liquid crystal display device of the third embodiment is installed in a wristwatch is shown in FIG. 9 and FIG. 10.

In this wristwatch, in an airtight package composed of a watch case, a glass 81, and a case back 82 (mainly as shown in FIG. 9), a dial cover 79, the absorption-type polarizing film 12 as the second polarizing film, the retardation film 74, the second substrate 5, the liquid crystal layer 8, the first substrate 1, the cholesteric liquid crystal polymer film 73, the printed layer 14' having a light transmitting characteristic, and the auxiliary light source 9 are provided from the glass 81 side.

The liquid crystal layer 8 is sealed between the first substrate 1 and the second substrate 5 with a sealant 4 and an end-sealing material (not shown).

On the case back 82 side under the first substrate 1, a circuit board 83 having a drive circuit for driving the liquid crystal display panel as shown in FIG. 3 and a battery 84 are provided. The electrical connection between the circuit board 83 and the liquid crystal display panel is performed by means of a zebra-rubber 85 in which conductive portions and nonconductive portions in stripes are laminated repeatedly.

A fixing metal support 86 is provided to reinforce the connection between the liquid crystal display panel and the circuit board 83 and to match the liquid crystal display panel with the watch case 75.

As shown in FIG. 9, an a.m. and p.m. display 76, and an hour display 77 and a minute display 78 by numbers can be performed by the liquid crystal display panel. Moreover, a setting terminal input portion 80 for performing time adjustment and turning on the auxiliary light source 9 is provided on the side face of the watch case 75.

On the glass 81 side of the second substrate 5, the dial cover 79 is provided so that a connecting portion between the second substrate 5 and the circuit board 83 and the sealant 4 can not be seen by the observer.

In the liquid crystal display device structured as above and the wristwatch using the liquid crystal display device, electric signals are applied to the scanning electrodes 2 on the first substrate 1 and the data electrodes 6 on the second substrate 5 and a voltage is applied to the liquid crystal layer 8, thereby controlling an optical characteristic of the STN liquid crystal layer 8, and a display by selective reflection can be realized by means of the cholesteric liquid crystal polymer film 73, the absorption-type polarizing film 12 and the retardation film 74.

As described above, the liquid crystal display device according to the present invention is used in a timepiece, whereby the reflection characteristic in a metallic tone of the cholesteric liquid crystal polymer film 73 can be utilized, so that improvement of attractive appearance and a bright time display can be realized.

Fourth Embodiment

The fourth embodiment of the present invention is explained with reference to FIG. 11 to FIG. 15.

Figure 11:
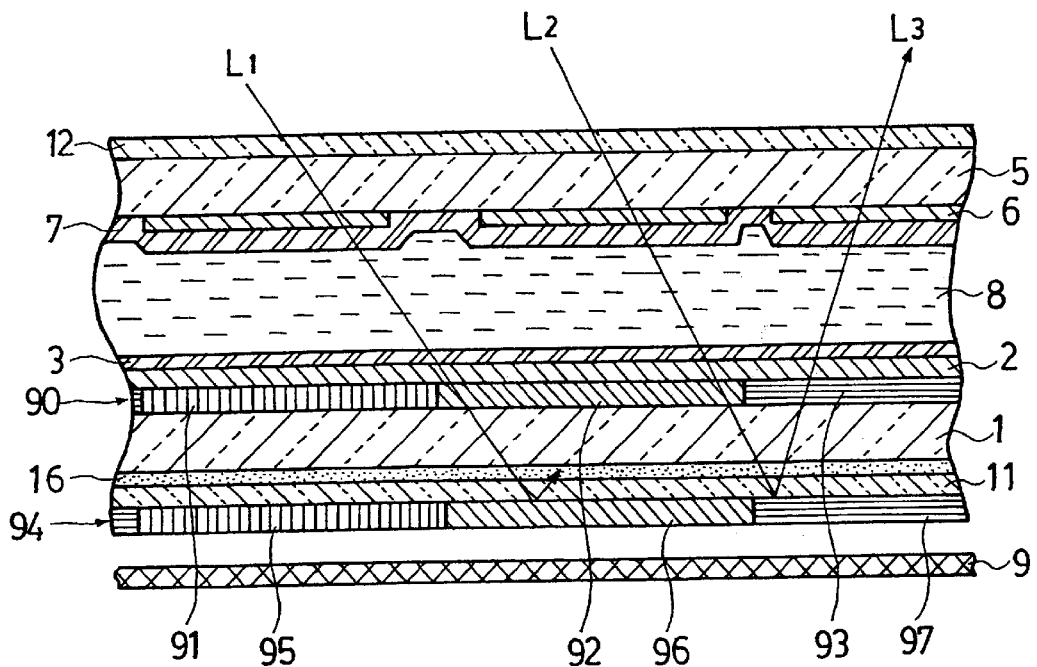
FIG. 11 and FIG. 12 are sectional views similar to FIG. 1 and FIG. 2 of the liquid crystal display panel of the liquid crystal display device of a fourth embodiment of the present invention.
Figure 12:
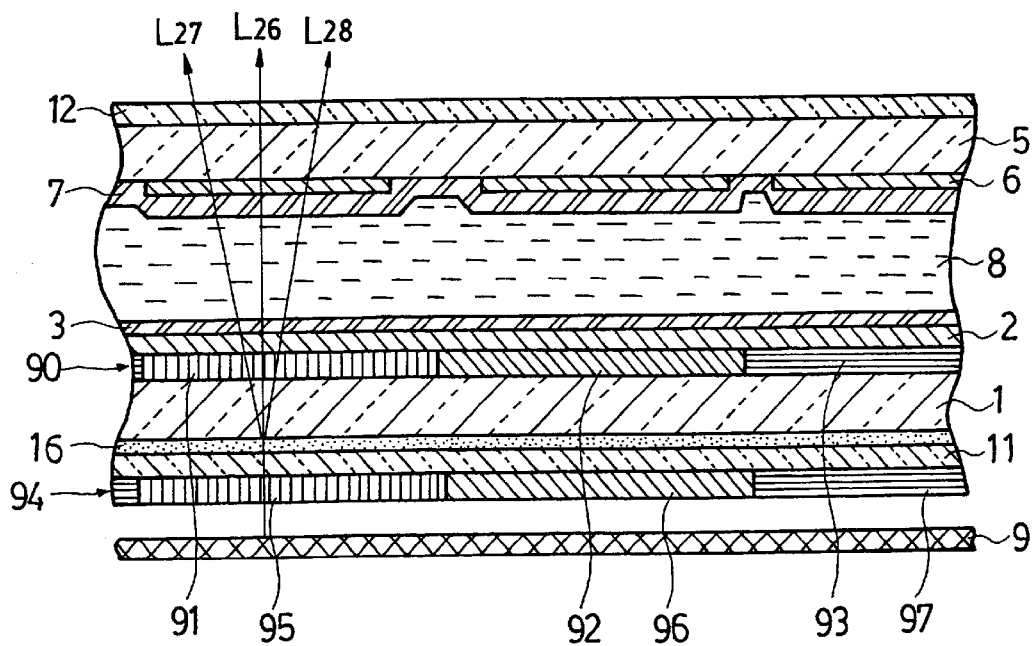

FIG. 11 and FIG. 12 are partly enlarged sectional views of the liquid crystal display device showing the fourth embodiment of the present invention and correspond to an enlarged sectional view along the A—A line in FIG. 16. The plane view showing the basic structure of the liquid crystal display device is also the same as that in FIG. 16, and thus the illustration thereof is omitted. FIG. 11 is a view for explaining display operations in the case where a display is performed utilizing an external light source as a main light source, and FIG. 12 is a view for explaining display operations in the case where a display is performed using an auxiliary light source.

The points of the liquid crystal display panel of the fourth embodiment that differ from the liquid crystal display panel of the first embodiment are that a first color filter 90 is provided on a first substrate 1, a scattering film 16 is disposed on the front face of a first polarizing film 11, and a second color filter 94 is provided on the rear face of the reflection-type polarizing film 11 which is the first polarizing film as a printed layer.

The remaining structure is the same as that of the first embodiment shown in FIG. 1 and FIG. 2, and thus the description thereof is omitted.

The first color filter 90 composed of red color filters 91, green color filters 92 and blue color filters 93 is provided on the inner face of the transparent first substrate 1 of this liquid crystal display panel, and a protection insulating film (not shown) is provided on the first color filter 90, and M pieces of scanning electrodes 2 made of a transparent electrode film are formed on the protection insulating film.

Moreover, the scattering film 16 having light scattering properties is provided on the front face side of the reflection-type polarizing film 11 which is the first polarizing film, and the second color filter 94 composed of red color filters 95, green color filters 96 and blue color filters 97 which are the same sizes and the same colors as respective red, green and blue color filters 91, 92 and 93 of the first color filter 90, is provided on the rear face side thereof. The second color filter 94 functions as a light absorbing layer during the reflection display by the external light.

An auxiliary light source 9 is provided on the under face side of the second color filter 94 with a predetermined gap therebetween. The auxiliary light source 9 is composed of a cold-cathode tube and a light guide film.

The reflection-type polarizing film 11 and the absorption-type polarizing film 12 are arranged in directions so that the transmission axes thereof are orthogonal to each other, and a twisted nematic (TN) liquid crystal layer for optically rotating passing light about 90° between the first substrate 1 and the second substrate 5 is used as the liquid crystal layer 8.

Therefore, when the environment is bright where the liquid crystal display device is used, as shown in FIG. 11, the external light is incident from the visible side of this liquid crystal display panel. Thus, at pixel portions for performing a dark display, a first incident light L1 passes through the second polarizing film 12 to become a linearly polarized light and is optically rotated 90° by the liquid crystal layer 8, it then passes through the first color filter 90 to become a scattered light by the scattering film 16, and is incident to the reflection-type polarizing film 11 as a light linearly polarized in the direction parallel to the transmission axis thereof, so that the light passes through the reflection-type polarizing film 11 and is incident to the second color filter 94 serving as an absorbing layer. Since reflection from the second color filter 94 is very low, outgoing light by the reflection becomes weak light, resulting in a dark display.

Moreover, at pixel portions for performing a bright display, a second incident light L2 passes through the second polarizing film 12 to become a linearly polarized light, optical rotatory of the liquid crystal layer 8 is lost by a large voltage being applied to the liquid crystal layer 8, and the incident linearly polarized light passes through without being optically rotated and is incident to the reflection-type polarizing film 11 as a light linearly polarized in the direction parallel to the reflection axis thereof. Therefore, the incident light L2 is reflected by the reflection-type polarizing film 11 to become a strong reflected light L3 and is given scattering properties by the scattering film 16 and passes through the liquid crystal layer 8 and the absorption-type polarizing film 12 to go out to the visible side.

As above, as for the bright and dark displays utilizing the external light source, the dark display is performed by the linearly polarized light being incident to the transmission axis of the reflection-type polarized film 11 and the absorption characteristic of the second color filter 94, and the bright display is performed by the reflection characteristic of the reflection-type polarizing film.

Meanwhile, when the environment is dark where the liquid crystal display panel is used, as shown in FIG. 12, the auxiliary light source 9 is turned on, whereby a light L26 goes out to the first substrate 1 side by emission of the auxiliary light source 9. In this case, the light from the auxiliary light source 9 passes through the second color filter 94 to be changed into colored light by each of the color filters 95, 96 and 97, and further passes through the reflection-type polarizing film 11 to become a linearly polarized light and is scattered by the scattering film 16 to become scattered lights L27 and 28. Furthermore, passing through the first color filter 90, the colored light is emphasized in chroma by each of the color filters 91, 92 and 93 and thereafter passes through the liquid crystal layer 8 and the absorption-type polarizing film 12 to go out to the visible side, thereby enabling a bright display.

The scattering film 16 can be formed by means for forming asperities on the surface of plastic, for mixing beads with different refractive indexes in plastic, or for mixing plastic beads with different refractive indexes in an adhesive, or the like.

Through the use of the liquid crystal display device structured as above, during the reflection display, light is changed to a colored light by the first color filter 90, and in the bright display, the light passes through the first color filter 90 twice back and forth by the reflection by means of the reflection-type polarizing film 11.

In the dark display, almost all the light passing through the reflection-type polarizing film 11 is absorbed by the absorption characteristic of the second color filter 94.

In contrast to the above, during the transmission display by turning on the auxiliary light source 9, the emitted light by the auxiliary light source 9 is changed to colored light by the second color filter 94, and in the bright display, the light passing through the reflection-type polarizing film 11 passes through the first color filter 90 to be emitted to the visible side. In the dark display, the light passing through the reflection-type polarizing film 11 is modulated by the liquid crystal layer 8 to be absorbed by the absorption-type polarizing film 12.

In other words, according to the liquid crystal display device of the fourth embodiment, in the case where only the first color filter 90 is provided, the light going out to the visible side passes through the first color filter twice in the reflection display, but it passes through once in the transmission display resulting in a display with poor chroma. However, as shown in the fourth embodiment, the use of the first color filter 90 and the second color filter 94 enables an excellent display both in the reflection display and in the transmission display.

However, brightness and darkness of a display are reversed in the case where the external light is used and in the case where the auxiliary light source is used when the same voltage is applied to the liquid crystal layer 8.

Figure 13:
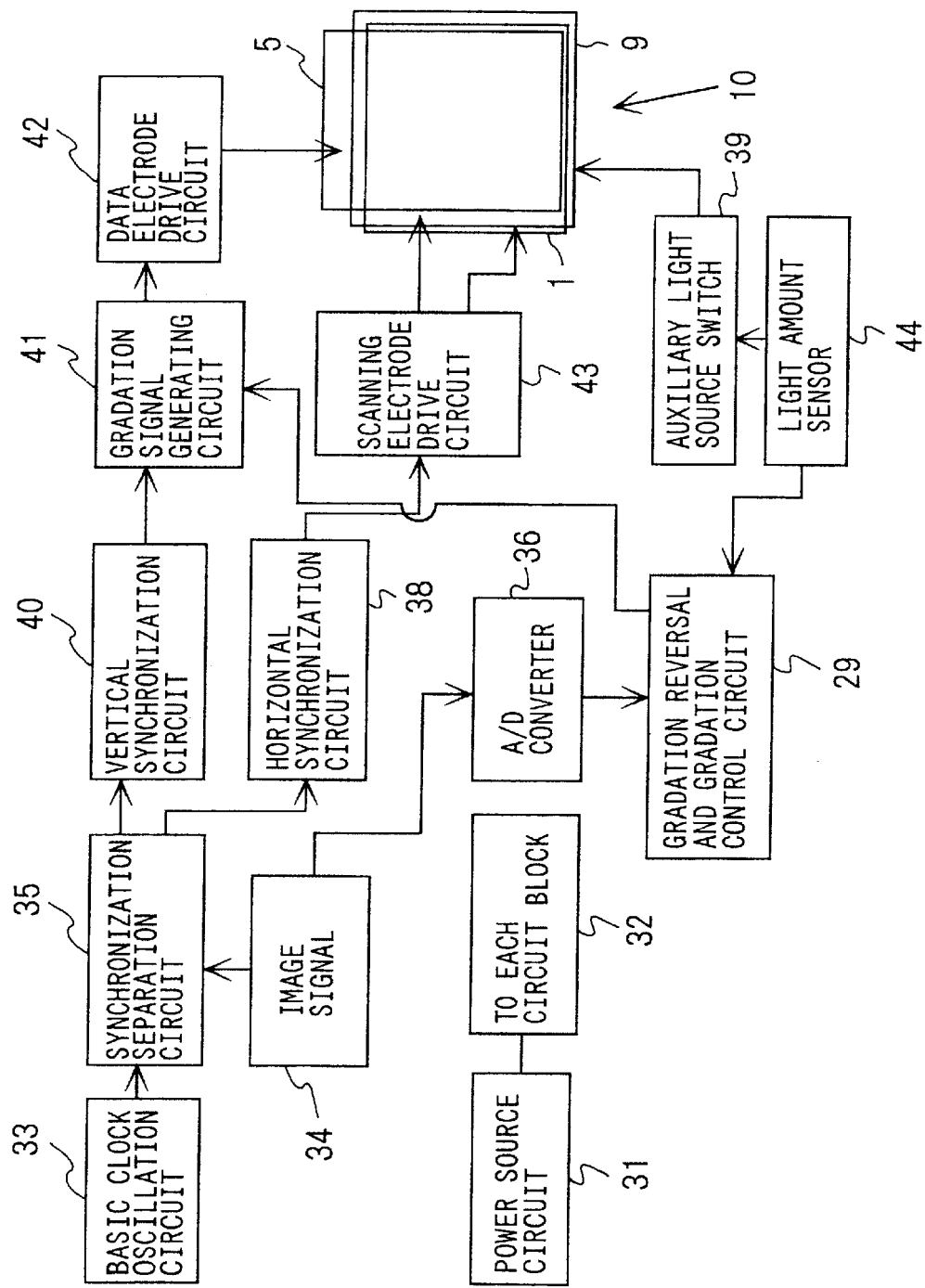
FIG. 13 is a block diagram of the drive circuit provided in the liquid crystal display device of the fourth embodiment of the present invention.

A drive circuit block diagram of the liquid crystal display device used in this embodiment is shown in FIG. 13. This embodiment is characterized in that the amount of light in the environment where the liquid crystal display device is used is detected by a light amount sensor 44, turning on the auxiliary light source 9, and reversing gradation by means of a gradation reversal and gradation control circuit 29 are simultaneously performed, and deviations of gradations in the reflection display and the transmission display are controlled. The other portions in the drive circuit shown in FIG. 13 are the same as those in the drive circuit used in the first embodiment shown in FIG. 3, and thus the description thereof is omitted.

The gradation reversal and gradation control circuit 29 performs an operation for reversing gradation signals in response to a detecting signal of the light amount sensor 44 when the external environment becomes dark and the auxiliary light source 9 is turned on. Moreover, in the case of the reflection display by the external light, the gradation reversal and gradation control circuit 29 controls whether halftone reflection of the display is deviated to the bright side or to the dark side in accordance with the brightness of the external environment. In the case of the transmission display by turning on the auxiliary light source 9, the gradation reversal and gradation control circuit 29 controls whether halftone transmission of the display is deviated to the bright side or to the dark side.

As shown in this drive circuit, ON or OFF of the gradation reversal and gradation control circuit 29 and the auxiliary light source 9 is set by a detecting signal of the light amount sensor 44 and reversal/non-reversal of a gradation signal is controlled, thereby decreasing changes in display quality due to changes in brightness of the external environment and turning on or turning off of the auxiliary light source 9 and simultaneously improving visibility.

Next, gradation controls of the reflection display and the transmission display, which are performed to improve display quality of the liquid crystal display device, when the auxiliary light source 9 is turned on and turned off are explained with reference to FIG. 14 and FIG. 15.

Figure 14:
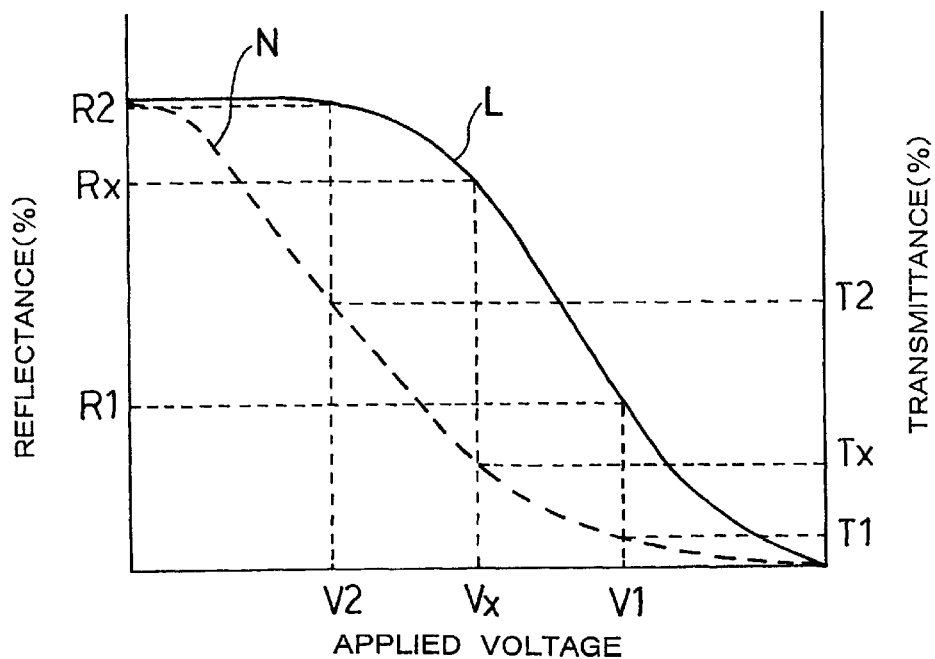
FIG. 14 is a diagram showing relations between applied voltage and transmittance of a liquid crystal showing a gradation display in a display where the environment is dark and where the liquid crystal display device of the embodiment of the present invention is used.
Figure 15:
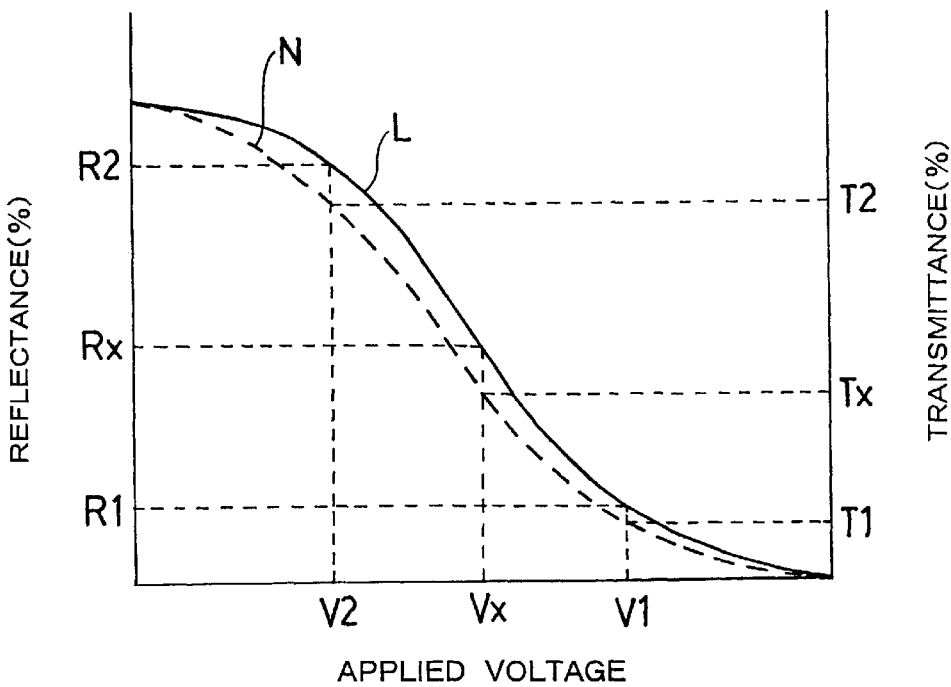
FIG. 15 is a diagram showing relations between applied voltage and transmittance of the liquid crystal showing a gradation display in a display where the environment is slightly bright where the liquid crystal display device of the same is used.

In each of the diagrams of FIG. 14 and FIG. 15, the lateral axis shows the voltage applied to the liquid crystal layer and the vertical axis shows the reflectance and the transmittance. The characteristics of the reflection display using the external light source is shown by a solid line L and the characteristics of the transmission display using the auxiliary light source is shown by a broken line N.

The brightness is shown by the reflectance when the external light source is used, and the brightness is shown by the transmittance when the auxiliary light source is used. The difference in brightness of the liquid crystal display device is displayed by the gradation, and controlled by the voltage applied to the liquid crystal layer. FIG. 14 is a diagram showing a control of the gradation reversal and gradation control circuit 29 when the auxiliary light source 9 is turned on and turned off in a dark external environment, and FIG. 15 is a diagram showing a control of the gradation reversal and gradation control circuit 29 when the auxiliary light source 9 is turned on and turned off in a slightly bright external environment.

In FIG. 14 and FIG. 15, the voltage applied to the liquid crystal layer 8 in the reflection display and in the transmission display is set, for convenience, in a direction where the transmittance and the reflectance rise mutually with an increase in voltage.

First, when the external environment is dark, the observer is sensitive to brightness and is sensitive also to chromaticity of the transmission display. Therefore, as shown in FIG. 14, at a center voltage Vx of the voltage applied to the liquid crystal layer, a large reflectance Rx is shown in the reflection display but a small transmittance Tx is shown in the transmission display.

At a voltage V1 that is a voltage applied to the liquid crystal layer, which is larger than the center voltage Vx, a still large reflectance R1 is shown in the reflection display but a very small transmittance T1 is shown in the transmission display. Conversely, at a voltage V2 smaller than the center voltage Vx, a large reflectance R2, which is almost saturated, is shown in the reflection display and a considerably small transmittance T2 is shown in the transmission display.

In other words, the reflection display is so set that the halftone thereof is deviated in a bright direction where the reflectance is large, and the transmission display is so set that the halftone thereof is deviated in a dark direction where the transmittance is small. As for the above setting, since the external environment is dark, a bright setting is required to secure the visibility when the auxiliary light source 9 is turned off. Conversely, since the bright display becomes possible when the auxiliary light source 9 is turned on, the transmission display is set in the dark direction, thereby making it possible to decrease the difference between the reflection display and the transmission display.

Next, when the external environment is comparatively bright, the observer is not sensitive to brightness and the reflection strength is high, resulting in a diagram where the halftone of the reflection display and the halftone of the transmission display are almost the same, as shown in FIG. 15.

In other words, the reflection display and the transmission display are set not to have large deviations. Moreover, in a brighter environment, it is enough to use the reflection display only, and it is preferable to use the reflection display so as to extend battery life by reducing power consumption of the liquid crystal display device.

The gradation reversal of the gradation reversal and gradation control circuit 29 is instantly changed by the light amount sensor 44, but the gradation control thereof is performed by changing the gradation control shown in FIG. 14 and FIG. 15 gradually with a lapse of time when the auxiliary light source 9 is turned on and turned off, thereby enabling a smooth switching of the gradation. This becomes a very effective means when the amount of light in the external environment is abruptly changed during moving by a car or the like.

INDUSTRIAL APPLICABILITY

The liquid crystal display device according to the present invention can realize a display with excellent visibility which is bright enough without reversal of brightness and darkness of the display during both the reflection display state by the external light and the transmission display state by turning on the auxiliary light source. It is possible to increase contrast of the display and to improve the viewing angle characteristic.

Moreover, it is possible to perform a color display and also to make the gradation adequate in correspondence with brightness.

For instance, a brightness of the environment where the liquid crystal display device is used by the external light source is detected by the light amount sensor, and correction of the gradation signal in such a manner that the halftone thereof is deviated in the bright direction or the dark direction is performed by the detecting signal of the light amount sensor, thereby making it possible to improve the display quality also in the case where the reflection display is performed.

Accordingly, through the use of the liquid crystal display device for a timepiece such as a wristwatch or the like and for a display device of various kinds of portable information processing devices, the visibility thereof is substantially improved.

What is claimed is:

1. A liquid crystal display device, comprising:
   a liquid crystal cell made by disposing a first substrate provided with scanning electrodes and a second substrate provided with data electrodes in such a manner that the scanning electrodes and the data electrodes are oppositely disposed to each other with a predetermined space therebetween, and a liquid crystal layer being filled between the first substrate and the second substrate,
   wherein the second substrate of said liquid crystal cell is disposed on the visible side, a polarizing film is disposed on the side of each face of the first substrate and second substrate opposite the face contacting the liquid crystal layer,
   wherein the polarizing film disposed on the first substrate side is a reflection-type polarizing film which transmits light linearly polarized in a direction parallel to a transmission axis thereof and reflects light linearly polarized in a direction parallel to a reflection axis thereof orthogonal to the transmission axis, an auxiliary light source is provided on the side of the reflection-type polarizing film opposite the face on the first substrate side, and
   wherein means for reversing a magnitude relation of a voltage applied to the liquid crystal layer between the auxiliary light source being turned on and being turned off is provided.

2. The liquid crystal display device according to claim 1, wherein a gradation signal is applied to the liquid crystal layer for displaying half tone and the means for reversing a magnitude relation of a voltage applied to the liquid crystal layer between the auxiliary light source being turned on and being turned off is a circuit for reversing a magnitude relation of a gradation signal applied to the liquid crystal layer.

3. The liquid crystal display device according to claim 2, wherein the gradation signal is set such that the halftone is deviated in a direction where the reflectance is large when the auxiliary light source is turned off, and the halftone is deviated in a direction where the transmittance is small when the auxiliary light source is turned on.

4. The liquid crystal display device according to claim 1, wherein a scattering film having light scattering properties is provided between the first substrate and the reflection-type polarizing film.

5. The liquid crystal display device according to claim 4, wherein the scattering film adheres to the reflection-type polarizing film.

6. The liquid crystal display device according to claim 1, wherein a light absorbing layer for transmitting part of light is provided between the reflection-type polarizing film and the auxiliary light source.

7. The liquid crystal display device according to claim 6, wherein a scattering film having light scattering properties is provided between the reflection-type polarizing film and the light absorbing layer.

8. The liquid crystal display device according to claim 7, wherein the scattering film adheres to the reflection-type polarizing film.

9. The liquid crystal display device according to claim 7, wherein the scattering film is a plastic film in which asperities are formed on the front face thereof or a plastic film in which beads with different refractive indexes are dispersed and is bonded to the rear face of the reflection-type polarizing film with an adhesive.

10. The liquid crystal display device according to claim 7, wherein a gap is provided between the scattering film and the light absorbing layer.

11. The liquid crystal display device according to claim 6, wherein the light absorbing layer is made of a printed layer having opening portions with a large transmittance and absorbing portions with a small transmittance.

12. The liquid crystal display device according to claim 11, wherein the light absorbing layer having the opening portions forms a grid form in which the opening portions and the absorbing portions are arranged regularly and the printed layer forming the absorbing portions is made of a thick film for absorbing external light by the thickness thereof when an incident angle of the external light becomes large.

13. The liquid crystal display device according to claim 6, wherein the light absorbing layer has a plurality of opening portions or portions having a transmission characteristic at a pixel portion.

14. A liquid crystal display device, comprising:
   a liquid crystal cell made by disposing a first substrate provided with scanning electrodes and a second substrate provided with data electrodes in such a manner that the scanning electrodes and the data electrodes are oppositely disposed to each other with a predetermined gap therebetween, and a liquid crystal layer being filled between the first substrate and the second substrate,
   wherein the second substrate of said liquid crystal cell is disposed on the visible side,
   wherein an absorption-type polarizing film is disposed on the side of a face of the second substrate opposite the face contacting the liquid crystal layer, and a cholesteric liquid crystal polymer film is disposed on the side of a face of the first substrate opposite to the face contacting the liquid crystal layer respectively,
   wherein an auxiliary light source is disposed on the side of a face of the cholesteric liquid crystal polymer film opposite the face on the first substrate side, and
   wherein means for reversing a magnitude relation of a voltage applied to the liquid crystal layer between the auxiliary light source being turned on and being turned off is provided.

15. The liquid crystal display device according to claim 14, wherein a gradation signal is applied to the liquid crystal layer for displaying halftone, and the means for reversing a magnitude relation of a voltage applied to the liquid crystal layer between the auxiliary light source being turned on and being turned off is a circuit for reversing a magnitude relation of a gradation signal applied to the liquid crystal layer.

16. The liquid crystal display device according to claim 5, wherein the gradation signal is set such that the halftone is deviated in a direction where the reflectance is large when the auxiliary light source is turned off and the halftone is deviated in a direction where the transmittance is small when the auxiliary light source is turned on.

17. The liquid crystal display device according to claim 14, wherein a retardation film is disposed between the second substrate and the absorption-type polarizing film, and a quarter-wavelength film is disposed between the first substrate and the cholesteric liquid crystal polymer film respectively.

18. The liquid crystal display device according to claim 14, wherein a light absorbing layer for transmitting part of light is provided between the cholesteric liquid crystal polymer film and the auxiliary light source.

19. The liquid crystal display device according to claim 18, wherein the light absorbing layer is a printed layer having transparency so that the light absorbing layer as a whole transmits part of light.

20. A liquid crystal display device, comprising:
    a liquid crystal cell made by disposing a first substrate provided with scanning electrodes and a second substrate provided with data electrodes in such a manner that the scanning electrodes and the data electrodes are opposed to each other with a predetermined gap therebetween, a liquid crystal layer being filled between the first substrate and the second substrate, and a first color filter being provided on the first substrate,
    wherein the second substrate of said liquid crystal cell is disposed on the visible side,
    wherein an absorption-type polarizing film is disposed on the side of a face of the second substrate opposite the face contacting the liquid crystal layer, and a reflection-type polarizing film is disposed on the side of a face of the first substrate opposite to the face contacting the liquid crystal layer respectively,
    wherein an auxiliary light source is disposed on the side of a face of the reflection-type polarizing film opposite to the face on the first substrate side with a second color filter therebetween, and
    wherein means for reversing magnitude relation of a voltage applied to the liquid crystal layer between the auxiliary light source being turned on and being turned off is provided.

21. The liquid crystal display device according to claim 20, wherein a scattering film having light scattering properties is provided between the first substrate and the second color filter.

22. The liquid crystal display device according to claim 21, wherein the scattering film is a plastic film in which asperities are formed on the front face thereof or a plastic film in which beads with different refractive indexes are dispersed.

23. The liquid crystal display device according to claim 21, wherein each of the first color filter and the second color filter is made of red, green, and blue color filters.

24. The liquid crystal display device according to claim 23, wherein the first color filter and the second color filter are provided on one face side of the first substrate and on the other face side respectively and disposed in such a manner that the color filters of the same color overlap one another with the first substrate therebetween in almost the same areas.

25. The liquid crystal display device according to claim 20, wherein means for controlling a voltage applied to the liquid crystal layer is provided to vary brightness of a display of a halftone in accordance with brightness of an external environment.

* * * * *